(12) United States Patent
Rule et al.

(10) Patent No.: US 11,521,262 B2
(45) Date of Patent: Dec. 6, 2022

(54) NFC ENHANCED AUGMENTED REALITY INFORMATION OVERLAYS

(71) Applicant: Capital One Services, LLC, McLean, VA (US)

(72) Inventors: Jeffrey Rule, Chevy Chase, MD (US); Kaitlin Newman, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/423,482

(22) Filed: May 28, 2019

(65) Prior Publication Data
US 2020/0380591 A1 Dec. 3, 2020

(51) Int. Cl.
| | |
|---|---|
| *G06Q 30/06* | (2012.01) |
| *G06K 7/10* | (2006.01) |
| *G06Q 20/34* | (2012.01) |
| *G06Q 20/38* | (2012.01) |
| *G06Q 20/40* | (2012.01) |

(Continued)

(52) U.S. Cl.
CPC ..... *G06Q 30/0643* (2013.01); *G06K 7/10297* (2013.01); *G06Q 20/341* (2013.01); *G06Q 20/352* (2013.01); *G06Q 20/3829* (2013.01); *G06Q 20/4018* (2013.01); *G06Q 30/0282* (2013.01); *G06T 11/60* (2013.01); *G06Q 2220/00* (2013.01)

(58) Field of Classification Search
CPC ........... G06Q 30/0643; G06Q 30/0282; G06Q 20/341; G06Q 20/352; G06Q 20/3829; G06Q 20/4018; G06K 7/10297
See application file for complete search history.

(56) References Cited

U.S. PATENT DOCUMENTS

| | | | |
|---|---|---|---|
| 4,683,553 | A | 7/1987 | Mollier |
| 4,827,113 | A | 5/1989 | Rikuna |
| 4,910,773 | A | 3/1990 | Hazard et al. |

(Continued)

FOREIGN PATENT DOCUMENTS

| | | |
|---|---|---|
| CA | 3010336 A1 | 7/2017 |
| CN | 101192295 A | 6/2008 |

(Continued)

OTHER PUBLICATIONS

Batina, L. and Poll, E., "SmartCards and RFID", Course PowerPoint Presentation for IPA Security Course, Digital Security at University of Nijmegen, Netherlands (date unknown) 75 pages.

(Continued)

*Primary Examiner* — Neha Patel
*Assistant Examiner* — Courtney P Jones
(74) *Attorney, Agent, or Firm* — KDB

(57) ABSTRACT

Various embodiments are directed to overlaying relevant product information in augmented reality via the use of near-field communication (NFC) and a product selection system. A user may authenticate into an application or user profile. Information about the user in the user profile may be used to determine which products are relevant to the user. Information related to the relevant products may then be displayed to the user in augmented reality, which improves at least the overall shopping and in-store experience.

20 Claims, 10 Drawing Sheets

(51) Int. Cl.
    *G06Q 30/02*    (2012.01)
    *G06T 11/60*    (2006.01)

(56) References Cited

U.S. PATENT DOCUMENTS

| | | | |
|---|---|---|---|
| 5,036,461 A | 7/1991 | Elliott et al. |
| 5,363,448 A | 11/1994 | Koopman, Jr. et al. |
| 5,377,270 A | 12/1994 | Koopman, Jr. et al. |
| 5,533,126 A | 7/1996 | Hazard |
| 5,537,314 A | 7/1996 | Kanter |
| 5,592,553 A | 1/1997 | Guski et al. |
| 5,616,901 A | 4/1997 | Crandall |
| 5,666,415 A | 9/1997 | Kaufman |
| 5,763,373 A | 6/1998 | Robinson et al. |
| 5,764,789 A | 6/1998 | Pare, Jr. et al. |
| 5,768,373 A | 6/1998 | Lohstroh et al. |
| 5,778,072 A | 7/1998 | Samar |
| 5,796,827 A | 8/1998 | Coppersmith et al. |
| 5,832,090 A | 11/1998 | Raspotnik |
| 5,883,810 A | 3/1999 | Franklin et al. |
| 5,901,874 A | 5/1999 | Deters |
| 5,929,413 A | 7/1999 | Gardner |
| 5,960,411 A | 9/1999 | Hartman et al. |
| 6,021,203 A | 2/2000 | Douceur et al. |
| 6,049,328 A | 4/2000 | Vanderheiden |
| 6,058,373 A | 5/2000 | Blinn et al. |
| 6,061,666 A | 5/2000 | Do et al. |
| 6,105,013 A | 8/2000 | Curry et al. |
| 6,199,114 B1 | 3/2001 | White et al. |
| 6,199,762 B1 | 3/2001 | Hohle |
| 6,216,227 B1 | 4/2001 | Goldstein et al. |
| 6,227,447 B1 | 5/2001 | Campisano |
| 6,282,522 B1 | 8/2001 | Davis et al. |
| 6,324,271 B1 | 11/2001 | Sawyer et al. |
| 6,342,844 B1 | 1/2002 | Rozin |
| 6,367,011 B1 | 4/2002 | Lee et al. |
| 6,402,028 B1 | 6/2002 | Graham, Jr. et al. |
| 6,438,550 B1 | 8/2002 | Doyle et al. |
| 6,501,847 B2 | 12/2002 | Helot et al. |
| 6,631,197 B1 | 10/2003 | Taenzer |
| 6,641,050 B2 | 11/2003 | Kelley et al. |
| 6,655,585 B2 | 12/2003 | Shinn |
| 6,662,020 B1 | 12/2003 | Aaro et al. |
| 6,721,706 B1 | 4/2004 | Strubbe et al. |
| 6,731,778 B1 | 5/2004 | Oda et al. |
| 6,779,115 B1 | 8/2004 | Naim |
| 6,792,533 B2 | 9/2004 | Jablon |
| 6,829,711 B1 | 12/2004 | Kwok et al. |
| 6,834,271 B1 | 12/2004 | Hodgson et al. |
| 6,834,795 B1 | 12/2004 | Rasmussen et al. |
| 6,852,031 B1 | 2/2005 | Rowe |
| 6,865,547 B1 | 3/2005 | Brake, Jr. et al. |
| 6,873,260 B2 | 3/2005 | Lancos et al. |
| 6,877,656 B1 | 4/2005 | Jaros et al. |
| 6,889,198 B2 | 5/2005 | Kawan |
| 6,905,411 B2 | 6/2005 | Nguyen et al. |
| 6,910,627 B1 | 6/2005 | Simpson-Young et al. |
| 6,971,031 B2 | 11/2005 | Haala |
| 6,990,588 B1 | 1/2006 | Yasukura |
| 7,006,986 B1 | 2/2006 | Sines et al. |
| 7,085,931 B1 | 8/2006 | Smith et al. |
| 7,127,605 B1 | 10/2006 | Montgomery et al. |
| 7,128,274 B2 | 10/2006 | Kelley et al. |
| 7,140,550 B2 | 11/2006 | Ramachandran |
| 7,152,045 B2 | 12/2006 | Hoffman |
| 7,165,727 B2 | 1/2007 | de Jong |
| 7,175,076 B1 | 2/2007 | Block et al. |
| 7,202,773 B1 | 4/2007 | Oba et al. |
| 7,206,806 B2 | 4/2007 | Pineau |
| 7,232,073 B1 | 6/2007 | de Jong |
| 7,246,752 B2 | 7/2007 | Brown |
| 7,254,569 B2 | 8/2007 | Goodman et al. |
| 7,263,507 B1 | 8/2007 | Brake, Jr. et al. |
| 7,270,276 B2 | 9/2007 | Vayssiere |
| 7,278,025 B2 | 10/2007 | Saito et al. |
| 7,287,692 B1 | 10/2007 | Patel et al. |
| 7,290,709 B2 | 11/2007 | Tsai et al. |
| 7,306,143 B2 | 12/2007 | Bonneau, Jr. et al. |
| 7,319,986 B2 | 1/2008 | Praisner et al. |
| 7,325,132 B2 | 1/2008 | Takayama et al. |
| 7,373,515 B2 | 5/2008 | Owen et al. |
| 7,374,099 B2 | 5/2008 | de Jong |
| 7,375,616 B2 | 5/2008 | Rowse et al. |
| 7,380,710 B2 | 6/2008 | Brown |
| 7,424,977 B2 | 9/2008 | Smets et al. |
| 7,453,439 B1 | 11/2008 | Kushler et al. |
| 7,472,829 B2 | 1/2009 | Brown |
| 7,487,357 B2 | 2/2009 | Smith et al. |
| 7,568,631 B2 | 8/2009 | Gibbs et al. |
| 7,584,153 B2 | 9/2009 | Brown et al. |
| 7,597,250 B2 | 10/2009 | Finn |
| 7,628,322 B2 | 12/2009 | Holtmanns et al. |
| 7,652,578 B2 | 1/2010 | Braun et al. |
| 7,689,832 B2 | 3/2010 | Talmor et al. |
| 7,703,142 B1 | 4/2010 | Wilson et al. |
| 7,748,609 B2 | 7/2010 | Sachdeva et al. |
| 7,748,617 B2 | 7/2010 | Gray |
| 7,748,636 B2 | 7/2010 | Finn |
| 7,762,457 B2 | 7/2010 | Bonalle et al. |
| 7,789,302 B2 | 9/2010 | Tame |
| 7,793,851 B2 | 9/2010 | Mullen |
| 7,796,013 B2 | 9/2010 | Murakami et al. |
| 7,801,799 B1 | 9/2010 | Brake, Jr. et al. |
| 7,801,829 B2 | 9/2010 | Gray et al. |
| 7,805,755 B2 | 9/2010 | Brown et al. |
| 7,809,643 B2 | 10/2010 | Phillips et al. |
| 7,827,115 B2 | 11/2010 | Weller et al. |
| 7,828,214 B2 | 11/2010 | Narendra et al. |
| 7,848,746 B2 | 12/2010 | Juels |
| 7,882,553 B2 | 2/2011 | Tuliani |
| 7,900,048 B2 | 3/2011 | Andersson |
| 7,908,216 B1 | 3/2011 | Davis et al. |
| 7,922,082 B2 | 4/2011 | Muscato |
| 7,933,589 B1 | 4/2011 | Mamdani et al. |
| 7,949,559 B2 | 5/2011 | Freiberg |
| 7,954,716 B2 | 6/2011 | Narendra et al. |
| 7,954,723 B2 | 6/2011 | Charrat |
| 7,962,369 B2 | 6/2011 | Rosenberg |
| 3,005,426 A1 | 8/2011 | Huomo et al. |
| 7,993,197 B2 | 8/2011 | Kaminkow |
| 8,010,405 B1 | 8/2011 | Bortolin et al. |
| RE42,762 E | 9/2011 | Shin et al. |
| 3,041,954 A1 | 10/2011 | Plesman |
| 3,060,012 A1 | 11/2011 | Sklovsky et al. |
| 8,074,877 B2 | 12/2011 | Mullen et al. |
| 8,082,450 B2 | 12/2011 | Frey et al. |
| 8,095,113 B2 | 1/2012 | Kean et al. |
| 8,099,332 B2 | 1/2012 | Lemay et al. |
| 8,103,249 B2 | 1/2012 | Markison |
| 8,108,687 B2 | 1/2012 | Ellis et al. |
| 8,127,143 B2 | 2/2012 | Abdallah et al. |
| 8,135,648 B2 | 3/2012 | Oram et al. |
| 8,140,010 B2 | 3/2012 | Symons et al. |
| 8,141,136 B2 | 3/2012 | Lee et al. |
| 8,150,321 B2 | 4/2012 | Winter et al. |
| 8,150,767 B2 | 4/2012 | Wankmueller |
| 8,186,602 B2 | 5/2012 | Itay et al. |
| 8,196,131 B1 | 6/2012 | von Behren et al. |
| 8,214,446 B1 * | 7/2012 | Siegel ............... G06F 21/31 |
| | | 705/5 |
| 8,215,563 B2 | 7/2012 | Levy et al. |
| 8,224,753 B2 | 7/2012 | Atef et al. |
| 8,232,879 B2 | 7/2012 | Davis |
| 8,233,841 B2 | 7/2012 | Griffin et al. |
| 8,245,292 B2 | 8/2012 | Buer |
| 8,249,654 B1 | 8/2012 | Zhu |
| 8,266,451 B2 | 9/2012 | Leydier et al. |
| 8,285,329 B1 | 10/2012 | Zhu |
| 8,302,872 B2 | 11/2012 | Mullen |
| 8,312,519 B1 | 11/2012 | Bailey et al. |
| 8,316,237 B1 | 11/2012 | Felsher et al. |
| 8,332,272 B2 | 12/2012 | Fisher |
| 8,365,988 B1 | 2/2013 | Medina, III et al. |
| 8,369,960 B2 | 2/2013 | Tran et al. |

(56) References Cited

U.S. PATENT DOCUMENTS

| | | |
|---|---|---|
| 8,371,501 B1 | 2/2013 | Hopkins |
| 8,381,307 B2 | 2/2013 | Cimino |
| 8,391,719 B2 | 3/2013 | Alameh et al. |
| 8,417,231 B2 | 4/2013 | Sanding et al. |
| 8,439,271 B2 | 5/2013 | Smets et al. |
| 8,475,367 B1 | 7/2013 | Yuen et al. |
| 8,489,112 B2 | 7/2013 | Roeding et al. |
| 8,511,542 B2 | 8/2013 | Pan |
| 8,559,872 B2 | 10/2013 | Butler |
| 8,566,916 B1 | 10/2013 | Bailey et al. |
| 8,567,670 B2 | 10/2013 | Stanfield et al. |
| 8,572,386 B2 | 10/2013 | Takekawa et al. |
| 8,577,810 B1 | 11/2013 | Dalit et al. |
| 8,583,454 B2 | 11/2013 | Beraja et al. |
| 8,589,335 B2 | 11/2013 | Smith et al. |
| 8,594,730 B2 | 11/2013 | Bona et al. |
| 8,606,645 B1 * | 12/2013 | Applefeld ............... G06Q 30/02 705/26.1 |
| 8,615,468 B2 | 12/2013 | Varadarajan |
| 8,620,218 B2 | 12/2013 | Awad |
| 8,667,285 B2 | 3/2014 | Coulier et al. |
| 8,723,941 B1 | 5/2014 | Shirbabadi et al. |
| 8,726,405 B1 | 5/2014 | Bailey et al. |
| 8,740,073 B2 | 6/2014 | Vijayshankar et al. |
| 8,750,514 B2 | 6/2014 | Gallo et al. |
| 8,752,189 B2 | 6/2014 | de Jong |
| 8,794,509 B2 | 8/2014 | Bishop et al. |
| 8,799,668 B2 | 8/2014 | Cheng |
| 8,806,592 B2 | 8/2014 | Ganesan |
| 8,807,440 B1 | 8/2014 | von Behren et al. |
| 8,811,892 B2 | 8/2014 | Khan et al. |
| 8,814,039 B2 | 8/2014 | Bishop et al. |
| 8,814,052 B2 | 8/2014 | Bona et al. |
| 8,818,867 B2 | 8/2014 | Baldwin et al. |
| 8,850,538 B1 | 9/2014 | Vernon et al. |
| 8,861,733 B2 | 10/2014 | Benteo et al. |
| 8,880,027 B1 | 11/2014 | Darringer |
| 8,888,002 B2 | 11/2014 | Marshall Chesney et al. |
| 8,898,088 B2 | 11/2014 | Springer et al. |
| 8,934,837 B2 | 1/2015 | Zhu et al. |
| 8,965,460 B1 | 2/2015 | Rao et al. |
| 8,977,569 B2 | 3/2015 | Rao |
| 8,994,498 B2 | 3/2015 | Agrafioti et al. |
| 9,004,365 B2 | 4/2015 | Bona et al. |
| 9,038,894 B2 | 5/2015 | Khalid |
| 9,042,814 B2 | 5/2015 | Royston et al. |
| 9,047,531 B2 | 6/2015 | Showering et al. |
| 9,069,976 B2 | 6/2015 | Toole et al. |
| 9,081,948 B2 | 7/2015 | Magne |
| 9,104,853 B2 | 8/2015 | Venkataramani et al. |
| 9,118,663 B1 | 8/2015 | Bailey et al. |
| 9,122,964 B2 | 9/2015 | Krawczewicz |
| 9,129,280 B2 | 9/2015 | Bona et al. |
| 9,152,832 B2 | 10/2015 | Royston et al. |
| 9,203,800 B2 | 12/2015 | Izu et al. |
| 9,209,867 B2 | 12/2015 | Royston |
| 9,251,330 B2 | 2/2016 | Boivie et al. |
| 9,251,518 B2 | 2/2016 | Levin et al. |
| 9,258,715 B2 | 2/2016 | Borghei |
| 9,270,337 B2 | 2/2016 | Zhu et al. |
| 9,306,626 B2 | 4/2016 | Hall et al. |
| 9,306,942 B1 | 4/2016 | Bailey et al. |
| 9,324,066 B2 | 4/2016 | Archer et al. |
| 9,324,067 B2 | 4/2016 | Van Os et al. |
| 9,332,587 B2 | 5/2016 | Salahshoor |
| 9,338,622 B2 | 5/2016 | Bjontegard |
| 9,373,141 B1 | 6/2016 | Shakkarwar |
| 9,379,841 B2 | 6/2016 | Fine et al. |
| 9,413,430 B2 | 8/2016 | Royston et al. |
| 9,413,768 B1 | 8/2016 | Gregg et al. |
| 9,420,496 B1 | 8/2016 | Indurkar |
| 9,426,132 B1 | 8/2016 | Alikhani |
| 9,432,339 B1 | 8/2016 | Bowness |
| 9,455,968 B1 | 9/2016 | Machani et al. |
| 9,473,509 B2 | 10/2016 | Arsanjani et al. |
| 9,491,626 B2 | 11/2016 | Sharma et al. |
| 9,553,637 B2 | 1/2017 | Yang et al. |
| 9,619,952 B1 | 4/2017 | Zhao et al. |
| 9,635,000 B1 | 4/2017 | Muftic |
| 9,665,858 B1 | 5/2017 | Kumar |
| 9,674,705 B2 | 6/2017 | Rose et al. |
| 9,679,286 B2 | 6/2017 | Colnot et al. |
| 9,680,942 B2 | 6/2017 | Dimmick |
| 9,710,804 B2 | 7/2017 | Zhou et al. |
| 9,740,342 B2 | 8/2017 | Paulsen et al. |
| 9,740,988 B1 | 8/2017 | Levin et al. |
| 9,763,097 B2 | 9/2017 | Robinson et al. |
| 9,767,329 B2 | 9/2017 | Forster |
| 9,769,662 B1 | 9/2017 | Queru |
| 9,773,151 B2 | 9/2017 | Mil'shtein et al. |
| 9,780,953 B2 | 10/2017 | Gaddam et al. |
| 9,891,823 B2 | 2/2018 | Feng et al. |
| 9,940,571 B1 | 4/2018 | Herrington |
| 9,953,323 B2 | 4/2018 | Candelore et al. |
| 9,961,194 B1 | 5/2018 | Wiechman et al. |
| 9,965,756 B2 | 5/2018 | Davis et al. |
| 9,965,911 B2 | 5/2018 | Wishne |
| 9,978,058 B2 | 5/2018 | Wurmfeld et al. |
| 10,043,164 B2 | 8/2018 | Dogin et al. |
| 10,075,437 B1 | 9/2018 | Costigan et al. |
| 10,129,648 B1 | 11/2018 | Hernandez et al. |
| 10,133,979 B1 | 11/2018 | Eidam et al. |
| 10,217,105 B1 | 2/2019 | Sangi et al. |
| 10,282,904 B1 * | 5/2019 | Ramesh ................ G06F 3/015 |
| 10,482,664 B1 * | 11/2019 | Schlosser ............ G06T 19/006 |
| 2001/0010723 A1 | 8/2001 | Pinkas |
| 2001/0029485 A1 | 10/2001 | Brody et al. |
| 2001/0034702 A1 | 10/2001 | Mockett et al. |
| 2001/0054003 A1 | 12/2001 | Chien et al. |
| 2002/0078345 A1 | 6/2002 | Sandhu et al. |
| 2002/0093530 A1 | 7/2002 | Krothapalli et al. |
| 2002/0100808 A1 | 8/2002 | Norwood et al. |
| 2002/0120583 A1 | 8/2002 | Keresman, III et al. |
| 2002/0152116 A1 | 10/2002 | Yan et al. |
| 2002/0153424 A1 | 10/2002 | Li |
| 2002/0165827 A1 | 11/2002 | Gien et al. |
| 2003/0023554 A1 | 1/2003 | Yap et al. |
| 2003/0034873 A1 | 2/2003 | Chase et al. |
| 2003/0055727 A1 | 3/2003 | Walker et al. |
| 2003/0078882 A1 | 4/2003 | Sukeda et al. |
| 2003/0167350 A1 | 9/2003 | Davis et al. |
| 2003/0208449 A1 | 11/2003 | Diao |
| 2004/0015958 A1 | 1/2004 | Veil et al. |
| 2004/0039919 A1 | 2/2004 | Takayama et al. |
| 2004/0127256 A1 | 7/2004 | Goldthwaite et al. |
| 2004/0215674 A1 | 10/2004 | Odinak et al. |
| 2004/0230799 A1 | 11/2004 | Davis |
| 2005/0044367 A1 | 2/2005 | Gasparini et al. |
| 2005/0075985 A1 | 4/2005 | Cartmell |
| 2005/0081038 A1 | 4/2005 | Arditti Modiano et al. |
| 2005/0138387 A1 | 6/2005 | Lam et al. |
| 2005/0156026 A1 | 7/2005 | Ghosh et al. |
| 2005/0160049 A1 | 7/2005 | Lundholm |
| 2005/0195975 A1 | 9/2005 | Kawakita |
| 2005/0247797 A1 | 11/2005 | Ramachandran |
| 2006/0006230 A1 | 1/2006 | Bear et al. |
| 2006/0040726 A1 | 2/2006 | Szrek et al. |
| 2006/0041402 A1 | 2/2006 | Baker |
| 2006/0044153 A1 | 3/2006 | Dawidowsky |
| 2006/0047954 A1 | 3/2006 | Sachdeva et al. |
| 2006/0085848 A1 | 4/2006 | Aissi et al. |
| 2006/0136334 A1 | 6/2006 | Atkinson et al. |
| 2006/0173985 A1 | 8/2006 | Moore |
| 2006/0174331 A1 | 8/2006 | Schuetz |
| 2006/0242698 A1 | 10/2006 | Inskeep et al. |
| 2006/0280338 A1 | 12/2006 | Rabb |
| 2007/0033642 A1 | 2/2007 | Ganesan et al. |
| 2007/0055630 A1 | 3/2007 | Gauthier et al. |
| 2007/0061266 A1 | 3/2007 | Moore et al. |
| 2007/0061487 A1 | 3/2007 | Moore et al. |
| 2007/0116292 A1 | 5/2007 | Kurita et al. |
| 2007/0118745 A1 | 5/2007 | Buer |
| 2007/0197261 A1 | 8/2007 | Humbel |
| 2007/0224969 A1 | 9/2007 | Rao |

(56) References Cited

U.S. PATENT DOCUMENTS

| | | |
|---|---|---|
| 2007/0241182 A1 | 10/2007 | Buer |
| 2007/0256134 A1 | 11/2007 | Lehtonen et al. |
| 2007/0258594 A1 | 11/2007 | Sandhu et al. |
| 2007/0278291 A1 | 12/2007 | Rans et al. |
| 2008/0008315 A1 | 1/2008 | Fontana et al. |
| 2008/0011831 A1 | 1/2008 | Bonalle et al. |
| 2008/0014867 A1 | 1/2008 | Finn |
| 2008/0035738 A1 | 2/2008 | Mullen |
| 2008/0071681 A1 | 3/2008 | Khalid |
| 2008/0072303 A1 | 3/2008 | Syed |
| 2008/0086767 A1 | 4/2008 | Kulkarni et al. |
| 2008/0103968 A1 | 5/2008 | Bies et al. |
| 2008/0109309 A1 | 5/2008 | Landau et al. |
| 2008/0110983 A1 | 5/2008 | Ashfield |
| 2008/0120711 A1 | 5/2008 | Dispensa |
| 2008/0156873 A1 | 7/2008 | Wilhelm et al. |
| 2008/0162312 A1 | 7/2008 | Sklovsky et al. |
| 2008/0164308 A1 | 7/2008 | Aaron et al. |
| 2008/0207307 A1 | 8/2008 | Cunningham, II et al. |
| 2008/0209543 A1 | 8/2008 | Aaron |
| 2008/0223918 A1 | 9/2008 | Williams et al. |
| 2008/0285746 A1 | 11/2008 | Landrock et al. |
| 2008/0308641 A1 | 12/2008 | Finn |
| 2009/0037275 A1 | 2/2009 | Pollio |
| 2009/0048026 A1 | 2/2009 | French |
| 2009/0132417 A1 | 5/2009 | Scipioni et al. |
| 2009/0143104 A1 | 6/2009 | Loh et al. |
| 2009/0171682 A1 | 7/2009 | Dixon et al. |
| 2009/0210308 A1 | 8/2009 | Toomer et al. |
| 2009/0235339 A1 | 9/2009 | Mennes et al. |
| 2009/0249077 A1 | 10/2009 | Gargaro et al. |
| 2009/0282264 A1 | 11/2009 | Ameil et al. |
| 2010/0023449 A1 | 1/2010 | Skowronek et al. |
| 2010/0023455 A1 | 1/2010 | Dispensa et al. |
| 2010/0029202 A1 | 2/2010 | Jolivet et al. |
| 2010/0033310 A1 | 2/2010 | Narendra et al. |
| 2010/0036769 A1 | 2/2010 | Winters et al. |
| 2010/0078471 A1 | 4/2010 | Lin et al. |
| 2010/0082491 A1 | 4/2010 | Rosenblatt et al. |
| 2010/0094754 A1 | 4/2010 | Bertran et al. |
| 2010/0095130 A1 | 4/2010 | Bertran et al. |
| 2010/0100480 A1 | 4/2010 | Altman et al. |
| 2010/0109844 A1* | 5/2010 | Carrick ................ G01S 11/02 340/10.1 |
| 2010/0114731 A1 | 5/2010 | Kingston et al. |
| 2010/0192230 A1 | 7/2010 | Steeves et al. |
| 2010/0207742 A1 | 8/2010 | Buhot et al. |
| 2010/0211797 A1 | 8/2010 | Westerveld et al. |
| 2010/0240413 A1 | 9/2010 | He et al. |
| 2010/0257357 A1 | 10/2010 | McClain |
| 2010/0312634 A1 | 12/2010 | Cervenka |
| 2010/0312635 A1 | 12/2010 | Cervenka |
| 2011/0028160 A1 | 2/2011 | Roeding et al. |
| 2011/0035604 A1 | 2/2011 | Habraken |
| 2011/0060631 A1 | 3/2011 | Grossman et al. |
| 2011/0068170 A1 | 3/2011 | Lehman |
| 2011/0084132 A1 | 4/2011 | Tofighbakhsh |
| 2011/0101093 A1 | 5/2011 | Ehrensvard |
| 2011/0113245 A1 | 5/2011 | Varadarajan |
| 2011/0125638 A1 | 5/2011 | Davis et al. |
| 2011/0131415 A1 | 6/2011 | Schneider |
| 2011/0153437 A1 | 6/2011 | Archer et al. |
| 2011/0153496 A1 | 6/2011 | Royyuru |
| 2011/0208658 A1 | 8/2011 | Makhotin |
| 2011/0208965 A1 | 8/2011 | Machani |
| 2011/0211219 A1 | 9/2011 | Bradley et al. |
| 2011/0218911 A1 | 9/2011 | Spodak |
| 2011/0238564 A1 | 9/2011 | Lim et al. |
| 2011/0246780 A1 | 10/2011 | Yeap et al. |
| 2011/0258452 A1 | 10/2011 | Coulier et al. |
| 2011/0280406 A1 | 11/2011 | Ma et al. |
| 2011/0282785 A1 | 11/2011 | Chin |
| 2011/0294418 A1 | 12/2011 | Chen |
| 2011/0312271 A1 | 12/2011 | Ma et al. |
| 2012/0024947 A1 | 2/2012 | Naelon |
| 2012/0030047 A1 | 2/2012 | Fuentes et al. |
| 2012/0030121 A1 | 2/2012 | Grellier |
| 2012/0047071 A1 | 2/2012 | Mullen et al. |
| 2012/0079281 A1 | 3/2012 | Lowenstein et al. |
| 2012/0109735 A1 | 5/2012 | Krawczewicz et al. |
| 2012/0109764 A1 | 5/2012 | Martin et al. |
| 2012/0143754 A1 | 6/2012 | Patel |
| 2012/0150737 A1 | 6/2012 | Rottink et al. |
| 2012/0178366 A1 | 7/2012 | Levy et al. |
| 2012/0196583 A1 | 8/2012 | Kindo |
| 2012/0207305 A1 | 8/2012 | Gallo et al. |
| 2012/0209773 A1 | 8/2012 | Ranganathan |
| 2012/0233070 A1 | 9/2012 | Calman et al. |
| 2012/0238206 A1 | 9/2012 | Singh et al. |
| 2012/0239560 A1 | 9/2012 | Pourfallah et al. |
| 2012/0252350 A1 | 10/2012 | Steinmetz et al. |
| 2012/0254394 A1 | 10/2012 | Barras |
| 2012/0284194 A1 | 11/2012 | Liu et al. |
| 2012/0290472 A1 | 11/2012 | Mullen et al. |
| 2012/0296818 A1 | 11/2012 | Nuzzi et al. |
| 2012/0316992 A1 | 12/2012 | Oborne |
| 2012/0317035 A1 | 12/2012 | Royyuru et al. |
| 2012/0317628 A1 | 12/2012 | Yeager |
| 2013/0005245 A1 | 1/2013 | Royston |
| 2013/0008956 A1 | 1/2013 | Ashfield |
| 2013/0026229 A1 | 1/2013 | Jarman et al. |
| 2013/0048713 A1 | 2/2013 | Pan |
| 2013/0054474 A1 | 2/2013 | Yeager |
| 2013/0065564 A1 | 3/2013 | Conner et al. |
| 2013/0080228 A1 | 3/2013 | Fisher |
| 2013/0080229 A1 | 3/2013 | Fisher |
| 2013/0085345 A1* | 4/2013 | Geisner ................ G02B 27/017 600/300 |
| 2013/0099587 A1 | 4/2013 | Lou et al. |
| 2013/0104251 A1 | 4/2013 | Moore et al. |
| 2013/0106576 A1 | 5/2013 | Hinman et al. |
| 2013/0117186 A1* | 5/2013 | Weinstein ............ H04W 12/04 705/67 |
| 2013/0119130 A1 | 5/2013 | Braams |
| 2013/0130614 A1 | 5/2013 | Busch-Sorensen |
| 2013/0144793 A1 | 6/2013 | Royston |
| 2013/0155107 A1 | 6/2013 | Ashour et al. |
| 2013/0171929 A1 | 7/2013 | Adams et al. |
| 2013/0179351 A1 | 7/2013 | Wallner |
| 2013/0185772 A1 | 7/2013 | Jaudon et al. |
| 2013/0191279 A1 | 7/2013 | Caiman et al. |
| 2013/0200999 A1 | 8/2013 | Spodak et al. |
| 2013/0216108 A1 | 8/2013 | Hwang et al. |
| 2013/0226791 A1 | 8/2013 | Springer et al. |
| 2013/0226796 A1 | 8/2013 | Jiang et al. |
| 2013/0232082 A1 | 9/2013 | Krawczewicz et al. |
| 2013/0238894 A1 | 9/2013 | Ferg et al. |
| 2013/0282360 A1 | 10/2013 | Shimota et al. |
| 2013/0303085 A1 | 11/2013 | Boucher et al. |
| 2013/0304651 A1 | 11/2013 | Smith |
| 2013/0305035 A1 | 11/2013 | Lyne et al. |
| 2013/0312082 A1 | 11/2013 | Izu et al. |
| 2013/0314593 A1 | 11/2013 | Reznik et al. |
| 2013/0344857 A1 | 12/2013 | Berionne et al. |
| 2014/0002238 A1 | 1/2014 | Taveau et al. |
| 2014/0019352 A1 | 1/2014 | Shrivastava |
| 2014/0027506 A1 | 1/2014 | Heo et al. |
| 2014/0032409 A1 | 1/2014 | Rosano |
| 2014/0032410 A1 | 1/2014 | Georgiev et al. |
| 2014/0040120 A1 | 2/2014 | Cho et al. |
| 2014/0040139 A1 | 2/2014 | Brudnicki et al. |
| 2014/0040147 A1 | 2/2014 | Varadarakan et al. |
| 2014/0047235 A1 | 2/2014 | Lessiak et al. |
| 2014/0067690 A1 | 3/2014 | Pitroda et al. |
| 2014/0074637 A1* | 3/2014 | Hammad ............ G06Q 20/227 705/21 |
| 2014/0074655 A1 | 3/2014 | Lim et al. |
| 2014/0081720 A1 | 3/2014 | Wu |
| 2014/0138435 A1 | 5/2014 | Khalid |
| 2014/0156459 A1 | 6/2014 | Zises |
| 2014/0171034 A1 | 6/2014 | Aleksin et al. |
| 2014/0171039 A1 | 6/2014 | Bjontegard |
| 2014/0172700 A1 | 6/2014 | Teuwen et al. |
| 2014/0180851 A1 | 6/2014 | Fisher |

(56) References Cited

U.S. PATENT DOCUMENTS

| | | |
|---|---|---|
| 2014/0207615 A1* | 7/2014 | Li ..................... G06Q 30/0623 705/26.61 |
| 2014/0208112 A1 | 7/2014 | McDonald et al. |
| 2014/0214547 A1* | 7/2014 | Signorelli .......... G06Q 30/0267 705/14.64 |
| 2014/0214674 A1 | 7/2014 | Narula |
| 2014/0222558 A1* | 8/2014 | Spivack .............. G02B 27/017 705/14.51 |
| 2014/0229375 A1 | 8/2014 | Zaytsev et al. |
| 2014/0245391 A1 | 8/2014 | Adenuga |
| 2014/0256251 A1 | 9/2014 | Caceres et al. |
| 2014/0258099 A1 | 9/2014 | Rosano |
| 2014/0258113 A1 | 9/2014 | Gauthier et al. |
| 2014/0258125 A1 | 9/2014 | Gerber et al. |
| 2014/0274179 A1 | 9/2014 | Zhu et al. |
| 2014/0279479 A1 | 9/2014 | Maniar et al. |
| 2014/0310056 A1* | 10/2014 | Alapati ................. G06Q 50/01 705/7.28 |
| 2014/0337174 A1 | 11/2014 | Lin et al. |
| 2014/0337235 A1 | 11/2014 | Van Heerden et al. |
| 2014/0339315 A1 | 11/2014 | Ko |
| 2014/0346860 A1 | 11/2014 | Aubry et al. |
| 2014/0365780 A1 | 12/2014 | Movassaghi |
| 2014/0379361 A1 | 12/2014 | Mahadkar et al. |
| 2015/0012444 A1 | 1/2015 | Brown et al. |
| 2015/0032635 A1 | 1/2015 | Guise |
| 2015/0071486 A1 | 3/2015 | Rhoads et al. |
| 2015/0088757 A1 | 3/2015 | Zhou et al. |
| 2015/0089586 A1 | 3/2015 | Ballesteros |
| 2015/0095228 A1* | 4/2015 | Su ..................... G06Q 20/3276 705/44 |
| 2015/0134452 A1 | 5/2015 | Williams |
| 2015/0140960 A1 | 5/2015 | Powell et al. |
| 2015/0154595 A1 | 6/2015 | Collinge et al. |
| 2015/0170138 A1 | 6/2015 | Rao |
| 2015/0178724 A1 | 6/2015 | Ngo et al. |
| 2015/0186871 A1 | 7/2015 | Laracey |
| 2015/0205379 A1 | 7/2015 | Mag et al. |
| 2015/0294385 A1* | 10/2015 | Grigg ................. G06Q 30/0613 705/26.41 |
| 2015/0302409 A1 | 10/2015 | Malek et al. |
| 2015/0317626 A1 | 11/2015 | Ran et al. |
| 2015/0332266 A1 | 11/2015 | Friedlander et al. |
| 2015/0339474 A1 | 11/2015 | Paz et al. |
| 2015/0371234 A1 | 12/2015 | Huang et al. |
| 2016/0012465 A1 | 1/2016 | Sharp |
| 2016/0026997 A1 | 1/2016 | Tsui et al. |
| 2016/0048913 A1 | 2/2016 | Rausaria et al. |
| 2016/0055480 A1 | 2/2016 | Shah |
| 2016/0057619 A1 | 2/2016 | Lopez |
| 2016/0065370 A1 | 3/2016 | Le Saint et al. |
| 2016/0078512 A1* | 3/2016 | Yopp ................... G06Q 30/0617 705/26.41 |
| 2016/0087957 A1 | 3/2016 | Shah et al. |
| 2016/0092696 A1 | 3/2016 | Guglani et al. |
| 2016/0148193 A1 | 5/2016 | Kelley et al. |
| 2016/0189288 A1* | 6/2016 | Todeschini ......... G06Q 30/0643 705/27.2 |
| 2016/0232523 A1 | 8/2016 | Venot et al. |
| 2016/0239672 A1 | 8/2016 | Khan et al. |
| 2016/0253651 A1 | 9/2016 | Park et al. |
| 2016/0255072 A1 | 9/2016 | Liu |
| 2016/0267486 A1 | 9/2016 | Mitra et al. |
| 2016/0277383 A1 | 9/2016 | Guyomarc'h et al. |
| 2016/0277388 A1 | 9/2016 | Lowe et al. |
| 2016/0307187 A1 | 10/2016 | Guo et al. |
| 2016/0307189 A1 | 10/2016 | Zarakas et al. |
| 2016/0314472 A1 | 10/2016 | Ashfield |
| 2016/0330027 A1 | 11/2016 | Ebrahimi |
| 2016/0335531 A1 | 11/2016 | Mullen et al. |
| 2016/0364788 A1* | 12/2016 | Jo ........................ G06Q 20/208 |
| 2016/0379217 A1 | 12/2016 | Hammad |
| 2017/0004502 A1 | 1/2017 | Quentin et al. |
| 2017/0011395 A1 | 1/2017 | Pillai et al. |
| 2017/0011406 A1 | 1/2017 | Tunnell et al. |
| 2017/0017957 A1 | 1/2017 | Radu |
| 2017/0017964 A1 | 1/2017 | Janefalkar et al. |
| 2017/0024716 A1 | 1/2017 | Jiam et al. |
| 2017/0039566 A1 | 2/2017 | Schipperheijn |
| 2017/0041759 A1 | 2/2017 | Gantert et al. |
| 2017/0068950 A1 | 3/2017 | Kwon |
| 2017/0103388 A1 | 4/2017 | Pillai et al. |
| 2017/0104739 A1 | 4/2017 | Lansler et al. |
| 2017/0109509 A1 | 4/2017 | Baghdasaryan |
| 2017/0109730 A1 | 4/2017 | Locke et al. |
| 2017/0116447 A1 | 4/2017 | Cimino et al. |
| 2017/0116596 A1* | 4/2017 | Tsui ..................... G06Q 20/353 |
| 2017/0124568 A1 | 5/2017 | Moghadam |
| 2017/0140379 A1 | 5/2017 | Deck |
| 2017/0154328 A1 | 6/2017 | Zarakas et al. |
| 2017/0154333 A1 | 6/2017 | Gleeson et al. |
| 2017/0180134 A1 | 6/2017 | King |
| 2017/0230189 A1 | 8/2017 | Toll et al. |
| 2017/0237301 A1 | 8/2017 | Elad et al. |
| 2017/0289127 A1 | 10/2017 | Hendrick |
| 2017/0295013 A1 | 10/2017 | Claes |
| 2017/0300999 A1* | 10/2017 | Wilkinson ............. G06Q 90/00 |
| 2017/0316696 A1 | 11/2017 | Bartel |
| 2017/0317834 A1 | 11/2017 | Smith et al. |
| 2017/0330173 A1 | 11/2017 | Woo et al. |
| 2017/0332235 A1* | 11/2017 | Smith ................... H04W 12/06 |
| 2017/0374070 A1 | 12/2017 | Shah et al. |
| 2018/0034507 A1 | 2/2018 | Wobak et al. |
| 2018/0039986 A1 | 2/2018 | Essebag et al. |
| 2018/0068316 A1 | 3/2018 | Essebag et al. |
| 2018/0114250 A1* | 4/2018 | Phillips ................. A63F 13/327 |
| 2018/0129945 A1 | 5/2018 | Saxena et al. |
| 2018/0160255 A1 | 6/2018 | Park |
| 2018/0165738 A1* | 6/2018 | Chilukuri ........... G06Q 30/0255 |
| 2018/0189829 A1* | 7/2018 | Patwardhan ....... G06Q 30/0254 |
| 2018/0191501 A1 | 7/2018 | Lindemann |
| 2018/0205712 A1 | 7/2018 | Versteeg et al. |
| 2018/0240106 A1 | 8/2018 | Garrett et al. |
| 2018/0254909 A1 | 9/2018 | Hancock |
| 2018/0268132 A1 | 9/2018 | Buer et al. |
| 2018/0270214 A1 | 9/2018 | Caterino et al. |
| 2018/0294959 A1 | 10/2018 | Traynor et al. |
| 2018/0300716 A1 | 10/2018 | Carlson |
| 2018/0302396 A1 | 10/2018 | Camenisch et al. |
| 2018/0315050 A1 | 11/2018 | Hammad |
| 2018/0316666 A1 | 11/2018 | Koved et al. |
| 2018/0322486 A1 | 11/2018 | Deliwala et al. |
| 2018/0359100 A1 | 12/2018 | Gaddam et al. |
| 2019/0000382 A1* | 1/2019 | Fitzpatrick ............... G06F 19/00 |
| 2019/0014107 A1 | 1/2019 | George |
| 2019/0019375 A1 | 1/2019 | Foley |
| 2019/0036678 A1 | 1/2019 | Ahmed |
| 2019/0102845 A1* | 4/2019 | Bui .................... G06Q 30/0259 |
| 2019/0156402 A1* | 5/2019 | Greenberger ....... G06K 9/00671 |
| 2019/0188876 A1* | 6/2019 | Song ........................ G06T 7/70 |
| 2019/0238517 A1 | 8/2019 | D'Agostino et al. |
| 2019/0244436 A1* | 8/2019 | Stansell ............. G06Q 30/0631 |
| 2020/0090411 A1* | 3/2020 | Zhou ........................ G06F 3/011 |
| 2021/0295308 A1* | 9/2021 | Dottax ................ G06Q 20/385 |

FOREIGN PATENT DOCUMENTS

| | | |
|---|---|---|
| CN | 103023643 A | 4/2013 |
| CN | 103417202 A | 12/2013 |
| EP | 1085424 A1 | 3/2001 |
| EP | 1223565 A1 | 7/2002 |
| EP | 1265186 A2 | 12/2002 |
| EP | 1783919 A1 | 5/2007 |
| EP | 2139196 A1 | 12/2009 |
| EP | 1469419 A1 | 8/2012 |
| EP | 2852070 A1 | 3/2015 |
| GB | 2457221 A | 8/2009 |
| GB | 2516861 A | 2/2015 |
| GB | 2551907 A | 1/2018 |
| KR | 101508320 B1 | 4/2015 |
| WO | 0049586 A1 | 8/2000 |
| WO | 2006070189 A2 | 7/2006 |
| WO | 2008055170 A2 | 5/2008 |

(56) References Cited

FOREIGN PATENT DOCUMENTS

| | | |
|---|---|---|
| WO | 2009025605 A2 | 2/2009 |
| WO | 2010049252 A1 | 5/2010 |
| WO | 2011112158 A1 | 9/2011 |
| WO | 2012001624 A1 | 1/2012 |
| WO | 2013039395 A1 | 3/2013 |
| WO | 2013155562 A1 | 10/2013 |
| WO | 2013192358 A2 | 12/2013 |
| WO | 2014043278 A1 | 3/2014 |
| WO | 2014170741 A2 | 10/2014 |
| WO | 2015179649 A1 | 11/2015 |
| WO | 2015183818 A1 | 12/2015 |
| WO | 2016097718 A1 | 6/2016 |
| WO | 2016160816 A1 | 10/2016 |
| WO | 2016168394 A1 | 10/2016 |
| WO | 2017042375 A1 | 3/2017 |
| WO | 2017042400 A1 | 3/2017 |
| WO | 2017157859 A1 | 9/2017 |
| WO | 2017208063 A1 | 12/2017 |
| WO | 2018063809 A1 | 4/2018 |
| WO | 2018137888 A1 | 8/2018 |

OTHER PUBLICATIONS

Haykin, M. and Warnar, R., "Smart Card Technology: New Methods for Computer Access Control", Computer Science and Technology NIST Special Publication 500-157:1-60 (1988).
Lehpamer, H., "Component of the RFID System", RFID Design Principles, 2nd edition pp. 133-201 (2012).
Author Unknown, "CardrefresherSM from American Express®", [online] 2019 [retrieved on Mar. 25, 2019]. Retrieved from Internet URL: https://merchant-channel.americanexpress.com/merchant/en_US/cardrefresher, 2 pages.
Author Unknown, "Add Account Updater to your recurring payment tool", [online] 2018-19 [retrieved on Mar. 25, 2019]. Retrieved from Internet URL: https://www.authorize.net/our-features/account-updater/, 5 pages.
Author Unknown, "Visa® Account Updater for Merchants", [online] 2019 [retrieved on Mar. 25, 2019], Retrieved from Internet URL: https://usa.visa.com/dam/VCOM/download/merchants/visa-account-updater-product-information-fact-sheet-for-merchants.pdf, 2 pages.
Author Unknown, "Manage the cards that you use with Apple Pay", Apple Support [online] 2019 [retrieved on Mar. 25, 2019]. Retrieved from Internet URL: https://support.apple.com/en-US/HT205583, 5 pages.
Author Unknown, "Contactless Specifications for Payment Systems", EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.
Author Unknown, "EMV Integrated Circuit Card Specifcations for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.
Author Unknown, "NFC Guide: All You Need to Know About Near Field Communication", Square Guide [online] 2018 [retrieved on Nov. 13, 2018], Retrieved from Internet URL: https://squareup.com/guides/nfc, 8 pages.
Profis, S., "Everything you need to know about NFC and mobile payments" CNET Directory [online], 2014 [retrieved on Mar. 25, 2019]. Retrieved from the Internet URL: https://www.cnet.com/how-to/how-nfc-works-and-mobile-payments/, 6 pages.
Cozma, N., "Copy data from other devices in Android 5.0 Lollipop setup", CNET Directory [online] 2014 [retrieved on Mar. 25, 2019]. Retrieved from the Internet URL: https://www.cnet.com/how-to/copy-data-from-other-devices-in-android-5-0-lollipop-setup/, 5 pages.
Kevin, Android Enthusiast, "How to copy text string from nfc tag", StackExchange [online] 2013 [retrieved on Mar. 25, 2019]. Retrieved from the Internet URL: https://android.stackexchange.com/questions/55689/how-to-copy-text-string-from-nfc-tag, 11 pages.
Author Unknown, "Tap & Go Device Setup", Samsung [online] date unknown [retrieved on Mar. 25, 2019]. Retrieved from the Internet URL: https://www.samsung.com/us/switch-me/switch-to-the-galaxy-s-5/app/partial/setup-device/tap-go.html, 1 page.
Author Unknown, "Multiple encryption", Wikipedia [online] 2019 [retrieved on Mar. 25, 2019]. Retrieved from Internet URL: https://en.wikipedia.org/wiki/Multiple_encryption, 4 pages.
Krawczyk, et al., "HMAC: Keyed-Hashing for Message Authentication", Network Working Group RFC:2104 memo [online] 1997 [retrieved on Mar. 25, 2019]. Retrieved from Internet URL: https://tools.ietf.org/html/rfc2104, 12 pages.
Song, et al., "The AES-CMAC Algorithm", Network Working Group RFC: 4493 memo [online] 2006 [retrieved on Mar. 25, 2019]. Retrieved from Internet URL: https//tools.ietf.org/html/rfc4493, 21 pages.
Katz, J. and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.
Adams, D., and Maier, A-K., "Goldbug Big Seven open source crypto-messengers to be compared—or Comprehensive Confidentiality Review & Audit of GoldBug Encrypting E-Mail-Client & Secure Instant Messenger", Big Seven Study 2016 [online] [retrieved on Mar. 25, 2018]. Retrieved from Internet URL: https://sf.net/projects/goldbug/files/bigseven-crypto-audit.pdf, 309 pages.
Author Unknown, "Triple DES", Wikipedia [online] 2018 [retrieved on Mar. 25, 2019]. Retrieved from Internet URL: https://simple.wikipedia.org/wiki/Triple_DES, 2 pages.
Song F., and Yun, A.I., "Quantum Security of NMAC and Related Constructions—PRF domain extension against quantum attacks", IACR Cryptology ePrint Archive [online] 2017 [retrieved on Mar. 25, 2019]. Retrieved from Internet URL: https://eprint.iacr.org/2017/509.pdf, 41 pages.
Saxena, N., "Lecture 10: NMAC, HMAC and Number Theory", CS 6903 Modern Cryptography [online] 2008 [retrieved an Mar. 25, 2019]. Retrieved from Internet URL: http://isis.poly.edu/courses/cs6903/Lectures/lecture10.pdf, 8 pages.
Berg, G., "Fundamentals of EMV", Smart Card Alliance [online] date unknown [retrieved on Mar. 27, 2019]. Retrieveed from Internet URL: https://www.securetechalliance.org/resources/media/scap13_preconference/02.pdf, 37 pages.
Pierce, K., "Is the amazon echo nfc compatible?", Amazon.com Customer Q&A [online] 2016 [retrieved on Mar. 26, 2019]. Retrieved from Internet URL: https://www.amazon.com/ask/questions/Tx1RJXYSPE6XLJD2_encodi . . . , 2 pages.
Author Unknown, "Multi-Factor Authentication", idaptive [online] 2019 [retrieved on Mar. 25, 2019]. Retrieved from Internet URL: https://www.centrify.com/products/application-services/adaptive-multi-factor-authentication/risk-based-mfa/, 10 pages.
Author Unknown, "Adaptive Authentication", SecureAuth [online] 2019 [retrieved on Mar. 25, 2019}. Retrieved from Internet URL: https://www.secureauth.com/products/access-management/adaptive-authentication, 7 pages.
van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.
Author Unknown, "Autofill", Computer Hope [online] 2018 [retrieved on Mar. 25, 2019]. Retrieved from Internet URL https://www.computerhope.com/jargon/a/autofill.htm, 2 pages.
Author Unknown, "Fill out forms automatically", Google Chrome Help [online] 2019 [retrieved on Mar. 25, 2019]. Retrieved from Internet URL: https://support.google.com/chrome/answer/142893?co=GENIE.PIatform%3DDesktop&hl=en, 3 pages.
Author Unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-brw1103/mac, 3 pages.
Menghin, M.J., "Power Optimization Techniques for Near Field Communication Systems", 2014 Dissertation at Technical Univer-

(56) References Cited

OTHER PUBLICATIONS sity of Graz [online]. Retrieved from Internet URL: https://diglib.tugraz.at/download.php?d=576a7b910d2d6&location=browse, 135 pages.

Mareli, M., et al., "Experimental evaluation of NFC reliability between an RFID tag and a smartphone", Conference paper (2013) IEEE AFRICON At Mauritius [online] [retrieved on Mar. 25, 2019]. Retrieved from Internet URL: https://core.ac.uk/download/pdf/54204839.pdf, 5 pages.

Davison, A., et al., "MonoSLAM: Real-Time Single Camera SLAM", IEEE Transactions on Pattern Analysis and Machine Intelligence 29(6): 1052-1067 (2007).

Barba, R., "Sharing your location with your bank sounds creepy, but it's also useful", Bankrate, LLC [online] 2017 [retrieved on Mar. 25, 2019]. Retrieved from Internet URL: https://www.bankrate.com/banking/banking-app-location-sharing/, 6 pages.

Author Unknown: "onetappayment™", [online] Jan. 24, 2019, [retrieved on Mar. 25, 2019]. Retrieved from Internet URL: https://www.payubiz.in/onetap, 4 pages.

Vu, et al., "Distinguishing users with capacitive touch communication", Proceedings of the Annual International Conference on Mobile Computing and Networking, 2012, MOBICOM. 10.1145/2348543.2348569.

Pourghomi, P., et al., "A Proposed NFC Payment Application," International Journal of Advanced Computer Science and Applications, 4(8):173-181 (2013).

Author unknown, "EMV Card Personalization Specification", EMVCo., LLC., specification version 1.0, (2003) 81 pages.

Ullmann et al., "On-Card" User Authentication for Contactless Smart Cards based on Gesture Recognition, paper presentation LNI proceedings, (2012) 12 pages.

Dhamdhere, P., "Key Benefits of a Unified Platform for Loyalty, Referral Marketing, and UGC", Annex Cloud [online] May 19, 2017 [retrieved on Jul. 3, 2019], Retrieved from Internet URL: https://www.annexcloude.com/blog/benefits-unified-platform/, 13 pages.

Faraj, S.T., et al., "Investigation of Java Smart Card Technology for Multi-Task Applications", J of Al-Anbar University for Pure Science, 2(1):23 pages (2008).

International Search Report and Written Opinion for International Patent Application No. PCT/US2020/033535 dated Aug. 10, 2020, 15 pages.

* cited by examiner

NFC ENHANCED AUGMENTED REALITY INFORMATION OVERLAYS

BACKGROUND

For customers, shopping online may offer certain advantages over shopping in a store. For example, online customers may be able to read various product reviews, read numerous user comments, view specification sheets, view images or videos of products outside of their packaging, etc. prior to purchasing a product. For in-store customers, however, product-related information, such as reviews, comments, or the like may not be readily available unless the customers perform online searches of every product they wish to purchase, which may be a tedious and time-consuming task.

SUMMARY

Various embodiments are directed to overlaying relevant product information in augmented reality via the use of near-field communication (NFC) and a product selection system. A user may authenticate into an application or user profile. Information about the user in the user profile may be used to determine which products are relevant to the user. Information related to the relevant products may then be displayed to the user in augmented reality, which improves at least the overall shopping and in-store experience.

DETAILED DESCRIPTION

Figure 1A:
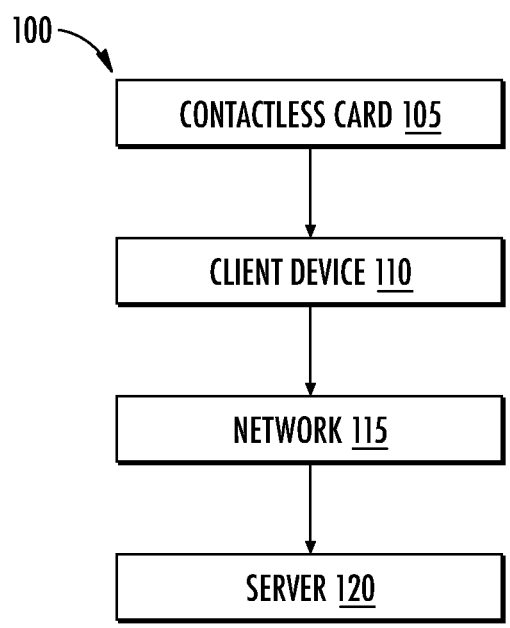
FIG. 1A illustrates an example data transmission system in accordance with one or more embodiments.

Various embodiments are generally directed to authenticating a user via a contactless near-field communication (NFC) smartcard, and based on the NFC authentication, overlaying virtual user-relevant, product-related information adjacent to one or more products in augmented reality (AR). In examples, the NFC authentication may provide the user a personalized in-store shopping experience. For instance, a shopping profile associated with the user may be accessed upon NFC authentication. Information associated with or contained in the shopping profile may be used to present in AR product-related information that is relevant to the user. Information that may be relevant to the user, for example, may include any product corresponding to the user's general shopping interests, shopping patterns, budgetary constraints, affinities toward specific types of sales, dietary restrictions, or the like.

According to embodiments, prior to or upon entering a store (e.g., a grocery store), the user may tap the user's contactless NFC card to a mobile computing device, such as a smartphone, a wearable computer, etc., to authenticate the user into an application and access the user's personal shopping profile. As will be further described below, this process may be referred to as "one-tap" authentication. The personal shopping profile may include various information related to the shopping preferences of the user, e.g., items previously purchased by the user, grocery lists previously created by the user, user-related diet plans, user-related dietary constraints, etc.

As the user moves within the store, for example, a user computing device may detect one or more NFC and/or RFID signals, and via these detected signals, the computing device may receive information corresponding to various types of products. In examples, the information from the detected signals may be analyzed so as to present only information relevant to the user. For instance, if the user is allergic to peanut butter, information related to peanut butter products may be filtered out and not displayed. As will be further described below, the product-related information may include at least in-store customer reviews, external customer reviews, in-store customer comments, external customer comments, information related to product safety, and so on.

The product information may be presented to the user in virtual information bubbles, which may be displayed on the user mobile computing device and float in an AR space so that they are persistently in close spatial association with the corresponding products or items in the store. In embodiments, the virtual information bubbles may be color coded based on semantic analysis to give a broad overview of positive and negative reviews, e.g., red may indicate a negative review, green may indicate a positive review. At a distance, color may the only feature of the information bubble visible to the user. As the user approaches a specific product, one or more headlines of the information bubble may come into view, and when the user gets even closer to the product, the customer may be able to read the entire content of the information bubble.

In examples, if the user desires to focus on a specific product and ignore the other displayed information bubbles, the user may tap the user mobile computing device on a product-specific NFC and/or RFID sensor located on or near the product. In other examples, a bar code of a specific product may be scanned.

In further examples, review and comments related to a product may be pulled from both in-store reviews from a specific store and web-based reviews of that product. The AR interface may allow these reviews and/or comments to be filtered and sorted. Moreover, if a user desires to review a particular product, the user may tap the user's contactless card onto the user mobile computing device to authenticate into an application, which may allow the user to quickly enter a comment or review without having to manually log into the application (which the user can still do).

The term "information bubble" used herein to describe how the product information is graphically displayed in AR may be understood to broadly mean any suitable manner in displaying the product information, e.g., text-only, bubbleshaped graphic, square-shaped graphic, rectangular-shaped graphic, various fonts, sizes, colors, etc.

In previous solutions, product-related information was not readily available to customers when shopping in brick-and-mortar stores. As described above, one way a customer could obtain product information in the store was to look up each and every product online, but that process was a tedious and overly cumbersome task. Moreover, the in-store shopping experience was not meaningfully personalized to each customer. The embodiments and examples described herein overcome and are advantageous over the previous solutions in that product-related information that is relevant to the user is provided in AR during the in-store shopping experience. In at least that regard, personalized, product-related information may be readily available to the user, which significantly improves the overall shopping experience.

Reference is now made to the drawings, where like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well-known structures and devices are shown in block diagram form to facilitate a description thereof. The intention is to cover all modification, equivalents, and alternatives within the scope of the claims.

FIG. 1A illustrates an example data transmission system according to one or more embodiments. As further discussed below, system 100 may include contactless card 105, client device 110, network 115, and server 120. Although FIG. 1A illustrates single instances of the components; system 100 may include any number of components.

System 100 may include one or more contactless cards 105, which are further explained below with reference to FIG. 3A and FIG. 3B. In some embodiments, contactless card 105 may be in wireless communication, utilizing NFC in an example, with client device 110.

System 100 may include client device 110, which may be a network-enabled computer. As referred to herein, a network-enabled computer may include, but is not limited to a computer device, or communications device including, e.g., a server, a network appliance, a personal computer, a workstation, a phone, a smartphone, a handheld PC, a personal digital assistant, a thin client, a fat client, an Internet browser, or other device. Client device 110 also may be a mobile computing device, for example, an iPhone, iPod, iPad from Apple® or any other suitable device running Apple's iOS® operating system, any device running Microsoft's Windows® Mobile operating system, any device running Google's Android® operating system, and/or any other suitable mobile computing device, such as a smartphone, a tablet, or like wearable mobile device.

The client device 110 device can include a processor and a memory, and it is understood that the processing circuitry may contain additional components, including processors, memories, error and parity/CRC checkers, data encoders, anti-collision algorithms, controllers, command decoders, security primitives, and tamper-proofing hardware, as necessary to perform the functions described herein. The client device 110 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touch-screen, keyboard, mouse, cursor-control device, touch-screen, microphone, digital camera, video recorder or camcorder. These devices may be used to enter information and interact with the software and other devices described herein.

In some examples, client device 110 of system 100 may execute one or more applications, such as software applications, that enable, for example, network communications with one or more components of system 100 and transmit and/or receive data.

Client device 110 may be in communication with one or more servers 120 via one or more networks 115 and may operate as a respective front-end to back-end pair with server 120. Client device 110 may transmit, for example, from a mobile device application executing on client device 110, one or more requests to server 120. The one or more requests may be associated with retrieving data from server 120. Server 120 may receive the one or more requests from client device 110. Based on the one or more requests from client device 110, server 120 may be configured to retrieve the requested data from one or more databases (not shown). Based on receipt of the requested data from the one or more databases, server 120 may be configured to transmit the received data to client device 110, the received data being responsive to one or more requests.

System 100 may include one or more networks 115. In some examples, network 115 may be one or more of a wireless network, a wired network or any combination of wireless network and wired network and may be configured to connect client device 110 to server 120. For example, network 115 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access (CDMA) based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, network 115 may include, without limitation, telephone lines, fiber optics, IEEE Ethernet 802.3, a wide area network, a wireless personal area network, a LAN, or a global network such as the Internet. In addition, network 115 may support an Internet network, a wireless communication network, a cellular network, or the like, or any combination thereof. Network 115 may further include one network, or any number of the exemplary types of networks mentioned above, operating as a stand-alone network or in cooperation with each other. Network 115 may utilize one or more protocols of one or more network elements to which they are communicatively coupled. Network 115 may translate to or from other protocols to one or more protocols of network devices. Although network 115 is depicted as a single network, it should be appreciated that according to one or more examples, network 115 may include a plurality of interconnected networks, such as, for example, the Internet, a service provider's network, a cable television network, corporate networks, such as credit card association networks, and home networks.

System 100 may include one or more servers 120. In some examples, server 120 may include one or more processors, which are coupled to the memory. Server 120 may be configured as a central system, server or platform to control and call various data at different times to execute a plurality of workflow actions. Server 120 may be configured to connect to the one or more databases. Server 120 may be connected to at least one client device 110.

Figure 1B:
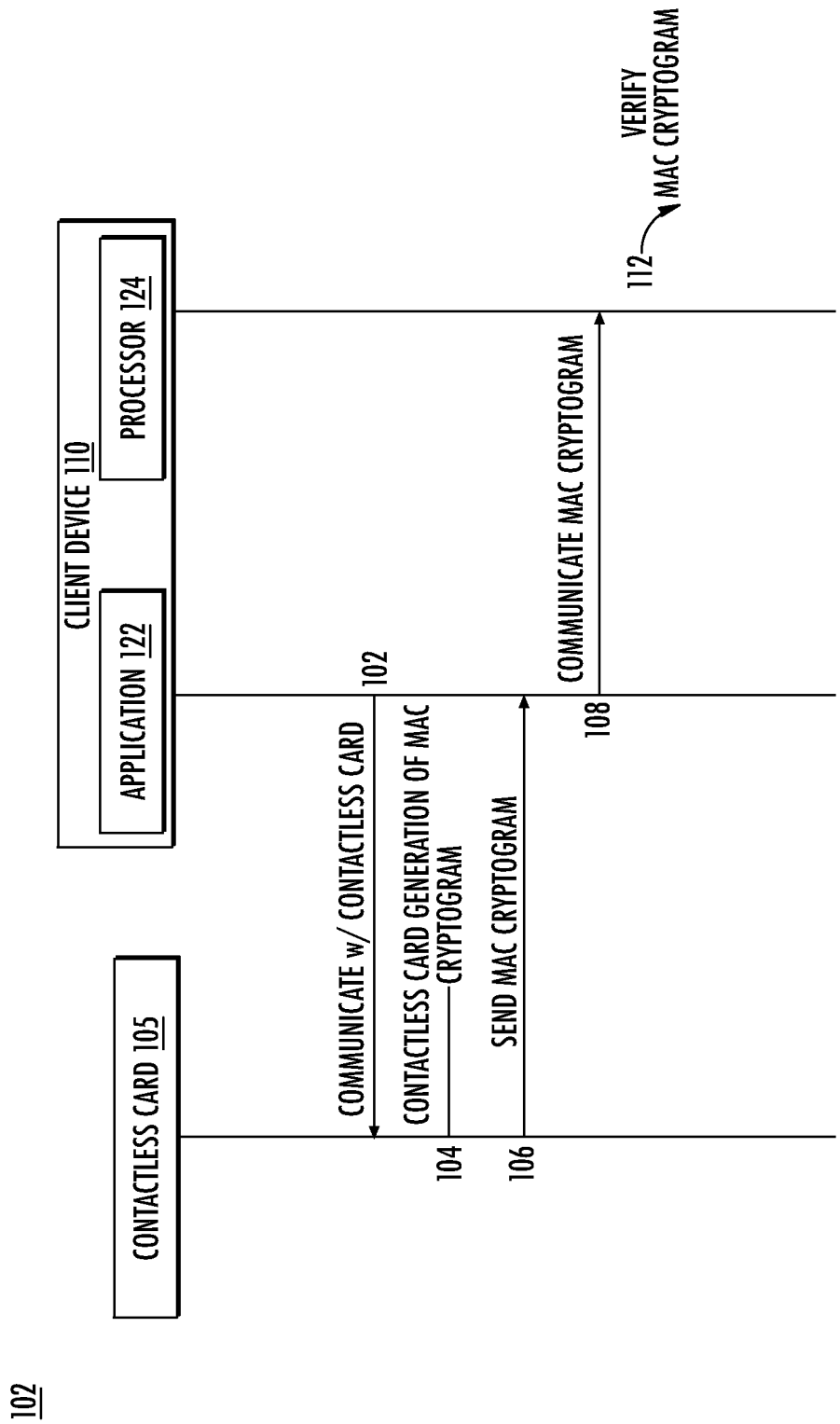
FIG. 1B illustrates an example sequence diagram for providing authenticated access in accordance with one or more embodiments.

FIG. 1B illustrates an example sequence diagram for providing authenticated access according to one or more embodiments. The diagram may include contactless card 105 and client device 110, which may include an application 122 and processor 124. FIG. 1B may reference similar components as illustrated in FIG. 1A.

At step 102, the application 122 communicates with the contactless card 105 (e.g., after being brought near the contactless card 105). Communication between the application 122 and the contactless card 105 may involve the contactless card 105 being sufficiently close to a card reader (not shown) of the client device 110 to enable NFC data transfer between the application 122 and the contactless card 105.

At step 104, after communication has been established between client device 110 and contactless card 105, the contactless card 105 generates a message authentication code (MAC) cryptogram. In some examples, this may occur when the contactless card 105 is read by the application 122. In particular, this may occur upon a read, such as an NFC read, of a near field data exchange (NDEF) tag, which may be created in accordance with the NFC Data Exchange Format.

For example, a reader, such as application 122, may transmit a message, such as an applet select message, with the applet ID of an NDEF producing applet. Upon confirmation of the selection, a sequence of select file messages followed by read file messages may be transmitted. For example, the sequence may include "Select Capabilities file," "Read Capabilities file," and "Select NDEF file." At this point, a counter value maintained by the contactless card 105 may be updated or incremented, which may be followed by "Read NDEF file." At this point, the message may be generated which may include a header and a shared secret. Session keys may then be generated. The MAC cryptogram may be created from the message, which may include the header and the shared secret. The MAC cryptogram may then be concatenated with one or more blocks of random data, and the MAC cryptogram and a random number (RND) may be encrypted with the session key. Thereafter, the cryptogram and the header may be concatenated, and encoded as ASCII hex and returned in NDEF message format (responsive to the "Read NDEF file" message).

In some examples, the MAC cryptogram may be transmitted as an NDEF tag, and in other examples, the MAC cryptogram may be included with a uniform resource indicator (e.g., as a formatted string).

In some examples, application 122 may be configured to transmit a request to contactless card 105, the request comprising an instruction to generate a MAC cryptogram.

At step 106, the contactless card 105 sends the MAC cryptogram to the application 122. In some examples, the transmission of the MAC cryptogram occurs via NFC. However, the present disclosure is not limited thereto. In other examples, this communication may occur via Bluetooth, Wi-Fi, or other means of wireless data communication.

At step 108, the application 122 communicates the MAC cryptogram to the processor 124. At step 112, the processor 124 verifies the MAC cryptogram pursuant to an instruction from the application 122. For example, the MAC cryptogram may be verified, as explained below.

In some examples, verifying the MAC cryptogram may be performed by a device other than client device 110, such as a server 120 in data communication with the client device 110 (as shown in FIG. 1A). For example, processor 124 may output the MAC cryptogram for transmission to server 120, which may verify the MAC cryptogram.

In some examples, the MAC cryptogram may function as a digital signature for purposes of verification. Other digital signature algorithms, such as public key asymmetric algorithms, e.g., the Digital Signature Algorithm and the RSA algorithm, or zero knowledge protocols, may be used to perform this verification.

It may be understood that in some examples, the contactless card 105 may initiate communication after the contactless card is brought near the client device 110. By way of example, the contactless card 105 may send the client device 110 a message, for instance, indicating that the contactless card has established communication. Thereafter, the application 122 of client device 110 may proceed to communicate with the contactless card at step 102, as described above.

Figure 2:
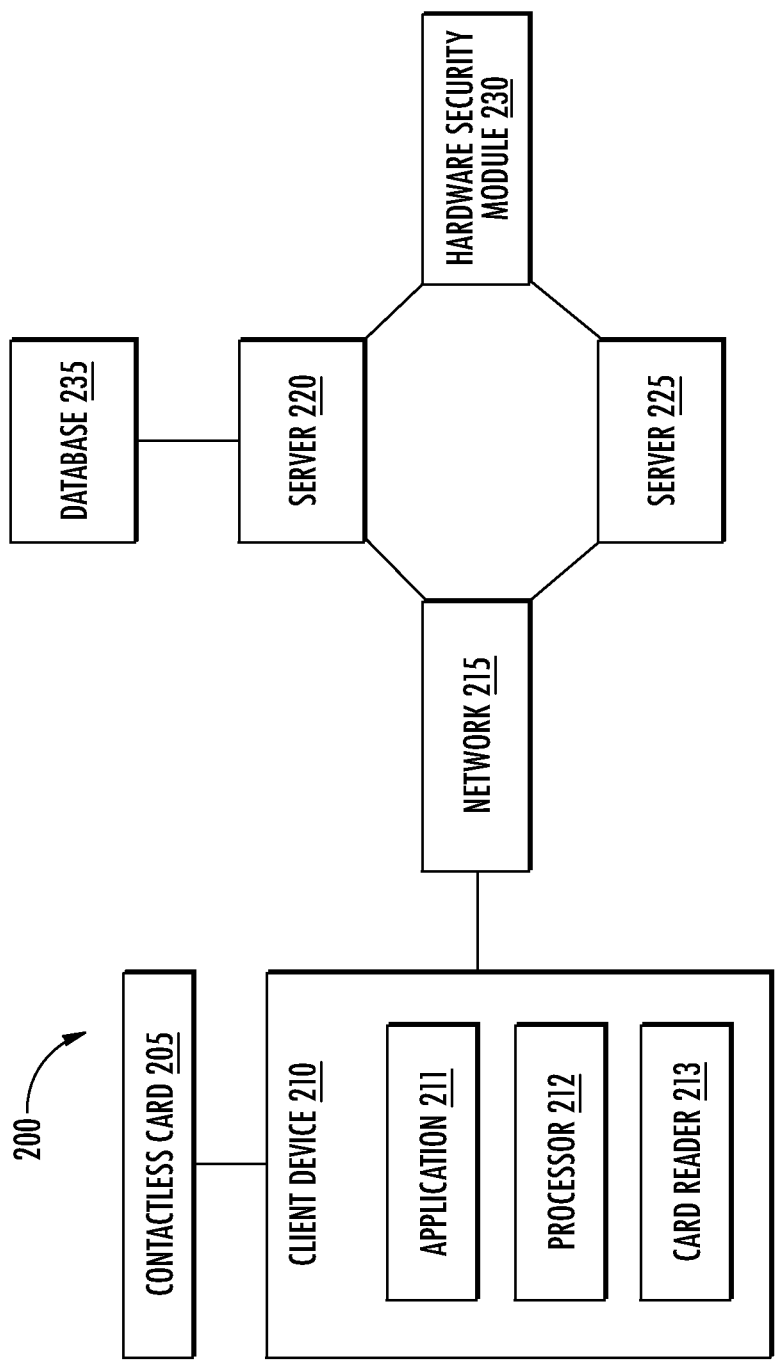
FIG. 2 illustrates an example system using a contactless card in accordance with one or more embodiments.

FIG. 2 illustrates an example system 200 using a contactless card. System 200 may include a contactless card 205, one or more client devices 210, network 215, servers 220, 225, one or more hardware security modules 230, and a database 235. Although FIG. 2 illustrates single instances of the components, system 200 may include any number of components.

System 200 may include one or more contactless cards 205, which are further explained below with respect to FIG. 3A and FIG. 3B. In some examples, contactless card 205 may be in wireless communication, for example, NFC communication, with client device 210. For example, contactless card 205 may include one or more chips, such as a radio frequency identification chip, configured to communicate via NFC or other short-range protocols. In other embodiments, contactless card 205 may communicate with client device 210 through other means including, but not limited to, Bluetooth, satellite, Wi-Fi, wired communications, and/or any combination of wireless and wired connections. According to some embodiments, contactless card 205 may be configured to communicate with card reader 213 (which may otherwise be referred to herein as NFC reader, NFC card reader, or reader) of client device 210 through NFC when the contactless card 205 is within range of card reader 213. In other examples, communications with contactless card 205 may be accomplished through a physical interface, e.g., a universal serial bus interface or a card swipe interface.

System 200 may include client device 210, which may be a network-enabled computer. As referred to herein, a network-enabled computer may include, but is not limited to: e.g., a computer device, or communications device including, e.g., a server, a network appliance, a personal computer, a workstation, a mobile device, a phone, a handheld PC, a personal digital assistant, a thin client, a fat client, an Internet browser, or other device. One or more client devices 210 also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone or like wearable mobile device. In some examples, the client device 210 may be the same as, or similar to, a client device 110 as described with reference to FIG. 1A or FIG. 1B.

Client device 210 may be in communication with one or more servers 220 and 225 via one or more networks 215.

Client device 210 may transmit, for example from an application 211 executing on client device 210, one or more requests to one or more servers 220 and 225. The one or more requests may be associated with retrieving data from one or more servers 220 and 225. Servers 220 and 225 may receive the one or more requests from client device 210. Based on the one or more requests from client device 210, one or more servers 220 and 225 may be configured to retrieve the requested data from one or more databases 235. Based on receipt of the requested data from the one or more databases 235, one or more servers 220 and 225 may be configured to transmit the received data to client device 210, the received data being responsive to one or more requests.

System 200 may include one or more hardware security modules (HSM) 230. For example, one or more HSMs 230 may be configured to perform one or more cryptographic operations as disclosed herein. In some examples, one or more HSMs 230 may be configured as special purpose security devices that are configured to perform the one or more cryptographic operations. The HSMs 230 may be configured such that keys are never revealed outside the HSM 230, and instead, are maintained within the HSM 230. For example, one or more HSMs 230 may be configured to perform at least one of key derivations, decryption, and MAC operations. The one or more HSMs 230 may be contained within or may be in data communication with, servers 220 and 225.

System 200 may include one or more networks 215. In some examples, network 215 may be one or more of a wireless network, a wired network or any combination of wireless network and wired network, and may be configured to connect client device 210 to servers 220 and/or 225. For example, network 215 may include one or more of a fiber optics network, a passive optical network, a cable network, a cellular network, an Internet network, a satellite network, a wireless LAN, a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based (CDMA) systems, D-AMPS, Wi-Fi, Fixed Wireless Data, IEEE 802.11b, 802.15.1, 802.11n and 802.11g, Bluetooth, NFC, RFID, Wi-Fi, and/or any combination of networks thereof. As a non-limiting example, communications from contactless card 205 and client device 210 may include NFC communication, the cellular network between client device 210 and a carrier, and Internet between the carrier and a back-end.

In addition, network 215 may include, without limitation, telephone lines, fiber optics, IEEE Ethernet 802.3, a wide area network, a wireless personal area network, a local area network, or a global network such as the Internet. In addition, network 215 may support an Internet network, a wireless communication network, a cellular network, or the like, or any combination thereof. Network 215 may further include one network, or any number of the exemplary types of networks mentioned above, operating as a stand-alone network or in cooperation with each other. Network 215 may utilize one or more protocols of one or more network elements to which they are communicatively coupled. Network 215 may translate to or from other protocols to one or more protocols of network devices. Although network 215 is depicted as a single network, it should be appreciated that according to one or more examples, network 215 may include a plurality of interconnected networks, such as, for example, the Internet, a service provider's network, a cable television network, corporate networks, such as credit card association networks, and home networks.

In various examples according to the present disclosure, client device 210 of system 200 may execute one or more applications 211 and include one or more processors 212, and one or more card readers 213. For example, one or more applications 211, such as software applications, may be configured to enable, for example, network communications with one or more components of system 200 and transmit and/or receive data. It is understood that although only single instances of the components of client device 210 are illustrated in FIG. 2, any number of devices 210 may be used. Card reader 213 may be configured to read from and/or communicate with contactless card 205. In conjunction with the one or more applications 211, card reader 213 may communicate with the contactless card 205. In examples, the card reader 213 may include circuitry or circuitry components, e.g., NFC reader coil, that generates a magnetic field to allow communication between the client device 210 and the contactless card 205.

The application 211 of any of client device 210 may communicate with the contactless card 205 using short-range wireless communication (e.g., NFC). The application 211 may be configured to interface with a card reader 213 of client device 210 configured to communicate with a contactless card 205. As should be noted, those skilled in the art would understand that a distance of less than twenty centimeters is consistent with NFC range.

In some embodiments, the application 211 communicates through an associated reader (e.g., card reader 213) with the contactless card 205.

In some embodiments, card activation may occur without user authentication. For example, a contactless card 205 may communicate with the application 211 through the card reader 213 of the client device 210 through NFC. The communication (e.g., a tap of the card proximate the card reader 213 of the client device 210) allows the application 211 to read the data associated with the card and perform an activation. In some cases, the tap may activate or launch application 211 and then initiate one or more actions or communications with an account server 225 to activate the card for subsequent use. In some cases, if the application 211 is not installed on client device 210, a tap of the card against the card reader 213 may initiate a download of the application 211 (e.g., navigation to an application download page). Subsequent to installation, a tap of the card may activate or launch the application 211, and then initiate (e.g., via the application or other back-end communication) activation of the card. After activation, the card may be used in various transactions including commercial transactions.

According to some embodiments, the contactless card 205 may include a virtual payment card. In those embodiments, the application 211 may retrieve information associated with the contactless card 205 by accessing a digital wallet implemented on the client device 210, wherein the digital wallet includes the virtual payment card. In some examples, virtual payment card data may include one or more static or dynamically generated virtual card numbers.

Server 220 may include a web server in communication with database 235. Server 225 may include an account server. In some examples, server 220 may be configured to validate one or more credentials from contactless card 205 and/or client device 210 by comparison with one or more credentials in database 235. Server 225 may be configured to authorize one or more requests, such as payment and transaction, from contactless card 205 and/or client device 210.

Figure 3A:
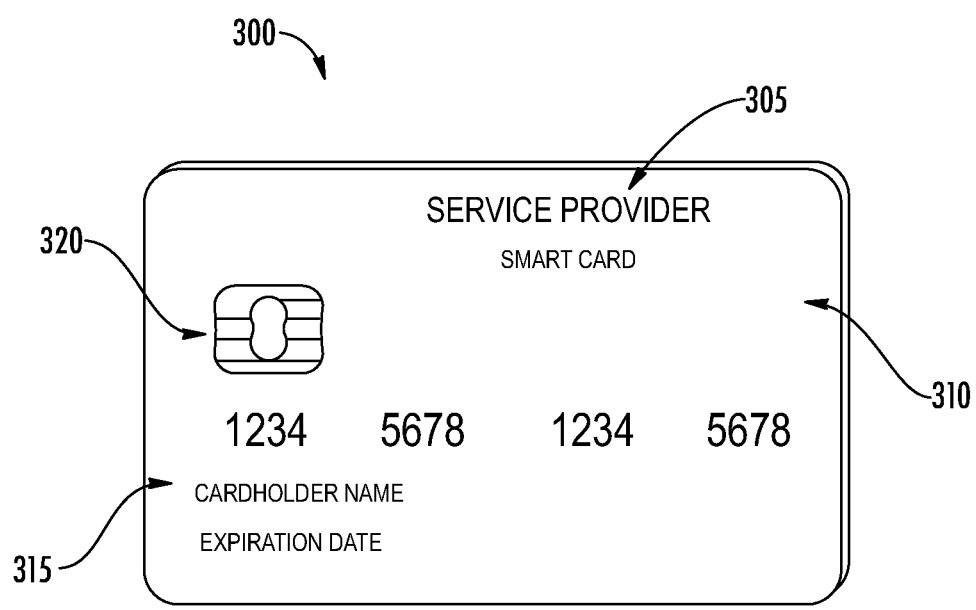
FIG. 3A illustrates an example contactless card in accordance with one or more embodiments.

FIG. 3A illustrates one or more contactless cards 300, which may include a payment card, such as a credit card, debit card, or gift card, issued by a service provider 305 displayed on the front or back of the card 300. In some examples, the contactless card 300 is not related to a payment card and may include, without limitation, an identification card. In some examples, the payment card may include a dual interface contactless payment card. The contactless card 300 may include a substrate 310, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 300 may have physical characteristics compliant with the ID-1 format of the ISO/IEC 7810 standard, and the contactless card may otherwise be compliant with the ISO/IEC 14443 standard. However, it is understood that the contactless card 300 according to the present disclosure may have different characteristics, and the present disclosure does not require a contactless card to be implemented in a payment card.

The contactless card 300 may also include identification information 315 displayed on the front and/or back of the card, and a contact pad 320. The contact pad 320 may be configured to establish contact with another communication device, such as a user device, smart phone, laptop, desktop, or tablet computer. The contactless card 300 may also include processing circuitry, antenna and other components not shown in FIG. 3A. These components may be located behind the contact pad 320 or elsewhere on the substrate 310. The contactless card 300 may also include a magnetic strip or tape, which may be located on the back of the card (not shown in FIG. 3A).

Figure 3B:
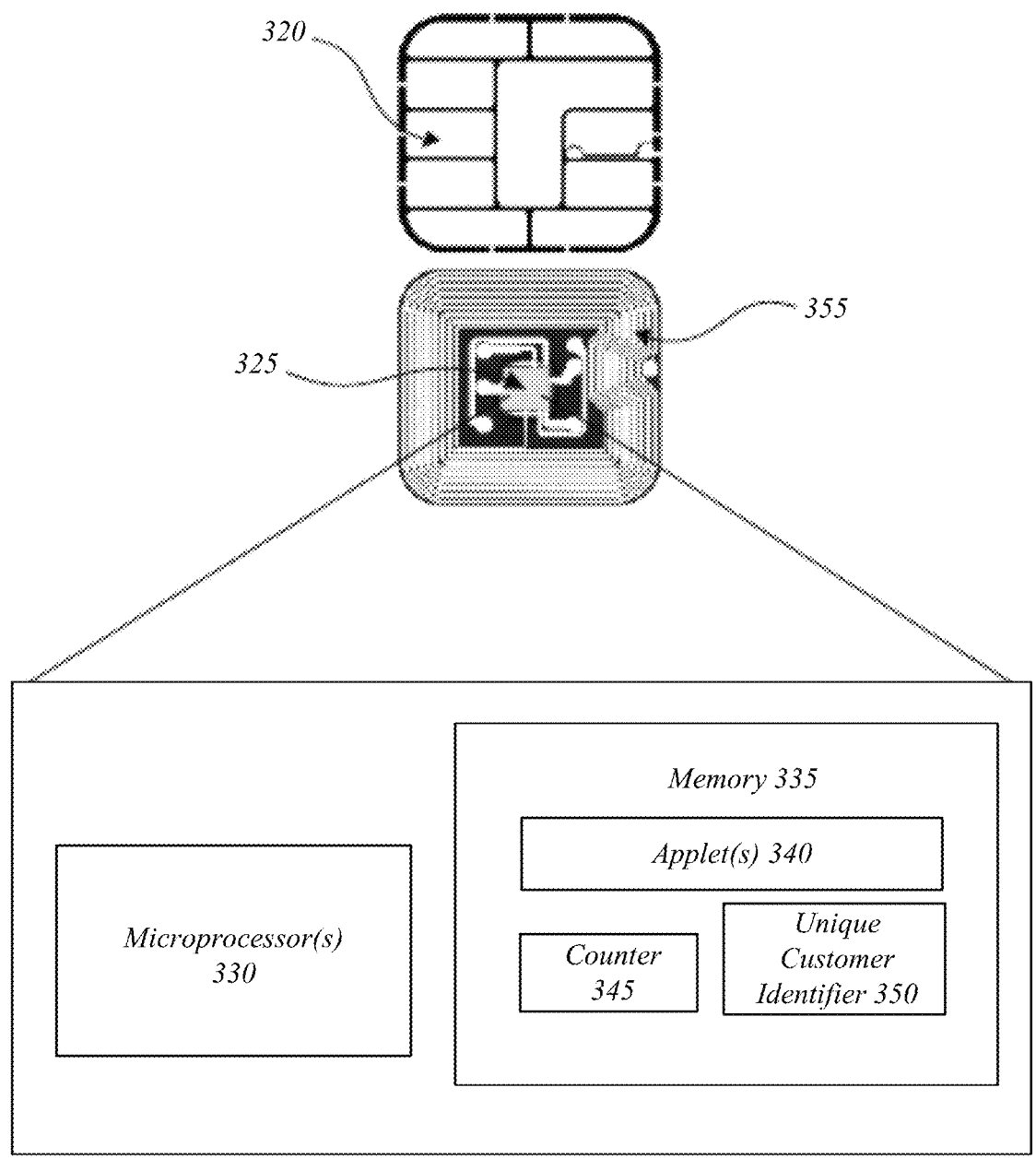
FIG. 3B illustrates an example contact pad of a contactless card in accordance with one or more embodiments.

As illustrated in FIG. 3B, the contact pad 320 of FIG. 3A may include processing circuitry 325 for storing and processing information, including a microprocessor 330 and a memory 335. It is understood that the processing circuitry 325 may contain additional components, including processors, memories, error and parity/CRC checkers, data encoders, anti-collision algorithms, controllers, command decoders, security primitives and tamper-proofing hardware, as necessary to perform the functions described herein.

The memory 335 may be a read-only memory, write-once read-multiple memory or read/write memory, e.g., RAM, ROM, and EEPROM, and the contactless card 300 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programmed many times after leaving the factory. It may also be read many times.

The memory 335 may be configured to store one or more applets 340, one or more counters 345, and a customer identifier 350. The one or more applets 340 may include one or more software applications configured to execute on one or more contactless cards, such as Java Card applet. However, it is understood that applets 340 are not limited to Java Card applets, and instead may be any software application operable on contactless cards or other devices having limited memory. The one or more counters 345 may include a numeric counter sufficient to store an integer. The customer identifier 350 may include a unique alphanumeric identifier assigned to a user of the contactless card 300, and the identifier may distinguish the user of the contactless card from other contactless card users. In some examples, the customer identifier 350 may identify both a customer and an account assigned to that customer and may further identify the contactless card associated with the customer's account.

The processor and memory elements of the foregoing exemplary embodiments are described with reference to the contact pad, but the present disclosure is not limited thereto. It is understood that these elements may be implemented outside of the pad 320 or entirely separate from it or as further elements in addition to processor 330 and memory 335 elements located within the contact pad 320.

In some examples, the contactless card 300 may include one or more antennas 355. The one or more antennas 355 may be placed within the contactless card 300 and around the processing circuitry 325 of the contact pad 320. For example, the one or more antennas 355 may be integral with the processing circuitry 325 and the one or more antennas 355 may be used with an external booster coil. As another example, the one or more antennas 355 may be external to the contact pad 320 and the processing circuitry 325.

In an embodiment, the coil of contactless card 300 may act as the secondary of an air core transformer. The terminal may communicate with the contactless card 300 by cutting power or amplitude modulation. The contactless card 300 may infer the data transmitted from the terminal using the gaps in the contactless card's power connection, which may be functionally maintained through one or more capacitors. The contactless card 300 may communicate back by switching a load on the contactless card's coil or load modulation. Load modulation may be detected in the terminal's coil through interference.

As explained above, the contactless cards 300 may be built on a software platform operable on smart cards or other devices having limited memory, such as JavaCard, and one or more or more applications or applets may be securely executed. Applets may be added to contactless cards to provide a one-time password (OTP) for multifactor authentication (MFA) in various mobile application-based use cases. Applets may be configured to respond to one or more requests, such as near field data exchange requests, from a reader, such as a mobile NFC reader, and produce an NDEF message that includes a cryptographically secure OTP encoded as an NDEF text tag.

Figure 4:
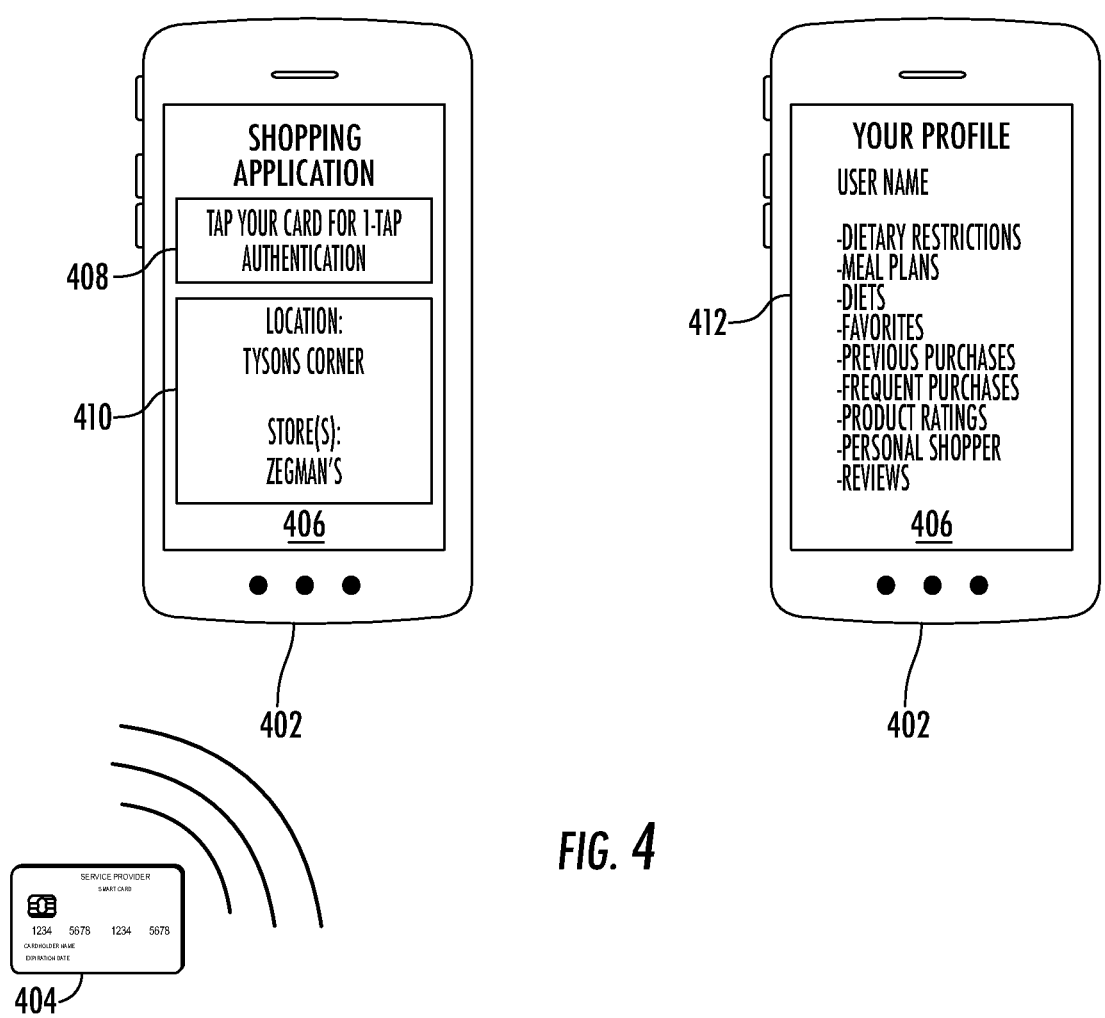
FIG. 4 illustrates an example sequence diagram relating to secure password generation in accordance with one or more embodiments.

FIG. 4 illustrates an example one-tap authentication using a contactless card according to one or more embodiments. As shown, a mobile computing device 402 may be a user or client device (which may also be referred to as a user computing device), such as a smartphone, wearable computer, etc. configured to communicate with a contactless card 404. As described above, the mobile computing device 402 may include at least an NFC card reader configured to establish NFC communication with the contactless card 404 via an NFC reader coil. It may be understood that the contactless card 404 may be similar or identical to the contactless card 300 described above.

In examples, a shopping application executing on the mobile computing device 402 may display a graphical user interface (GUI) module 406 to perform one-tap authentication, AR display, and in some example, one-tap payment. A notification 408 may instruct the user to tap the contactless card 404 to the mobile computing device 402 to authenticate into the shopping application. Moreover, in embodiments, a global positioning system (GPS) feature or graphic 410 may display the current location of the computing device 402

(e.g., Tysons Corner) and may further display the closest store(s) within a predefined area of the current location.

Upon the user tapping the contactless card 404 to the mobile computing device 402, the contactless card 404 may generate encrypted data and transmit the same to the computing device 404. Once received, the one-tap GUI module 406 may transmit at least the encrypted data to an authentication server, which may decrypt the data and verify the data with a private key stored in the memory of the server. The authentication server may then authenticate the user of the contactless card 404 and send the mobile computing device 402 confirmation thereof. Thereafter, the one-tap GUI module 406 may display a profile 412 and various other information related to the user.

As illustrated, the user profile 412 may display one or more of the following information: the user's name, the user's dietary restrictions (if any), various meal plans that the user may be on (e.g., budget meal plans, protein-based meal plans), diets that the user may be on (e.g., no-carb diet, fruit-and-vegetable diet), various user favorites (e.g., favorite snacks, favorite seasonal fruits, favorite proteins, etc.), previous user purchases (e.g., a list of previously purchased products within a predefined time period), a list of frequently purchased items, preferences on product ratings (e.g., whether the user prefers only three-star rated products and up), any linkable personal shopper systems (e.g., automated shopping assistance devices), and a link for reviews (e.g., a platform that allows the user to give or provide reviews). It may be understood that each of the foregoing user-specific information can be interactively selectable by the user (directing the user to a separate GUI or page) and may allow the user to customize any related information.

In further examples, while shopping or perusing in a store, one-tap authentication may allow a user to quickly and efficiently open the shopping application with a single tap of the contactless card 404 and enter review(s) of a product. In addition to one-tap authentication, in some examples, a user may be able to perform one-tap payment of certain products.

For example, when the contactless card 404 is tapped to the mobile computing device 402, a merchant ID and a transaction ID may be sent to the authentication server. A virtual account number (VAN) generator may be used to generate virtual card data (e.g., a virtual card number, expiration date, and/or CVV) associated with the contactless card 404. The VAN generator may then transmit the virtual card data, the merchant ID, transaction ID, and any usernames and/or addresses corresponding to the user to one or more merchant servers (for example, the merchant server(s) may be associated with the store that the user is currently shopping in). The merchant server may then process the transaction using the data received from the VAN generator, e.g., by generating a transaction record in a transaction database using at least the received virtual card number, expiration date, CVV, etc. The transaction record may further include the user's name, billing address, shipping address, and an indication of each item and/or service purchased. The merchant server may then transmit an order confirmation to the mobile computing device 404. Thus, for example, if the user picks out various items to purchase, but wishes to purchase the items with one-tap payment (as opposed to paying for the items in a check-out line), the user may tap the contactless card 404, arrange delivery of the items (either in-store or via the shopping application), and walk out of the store.

Figure 5:
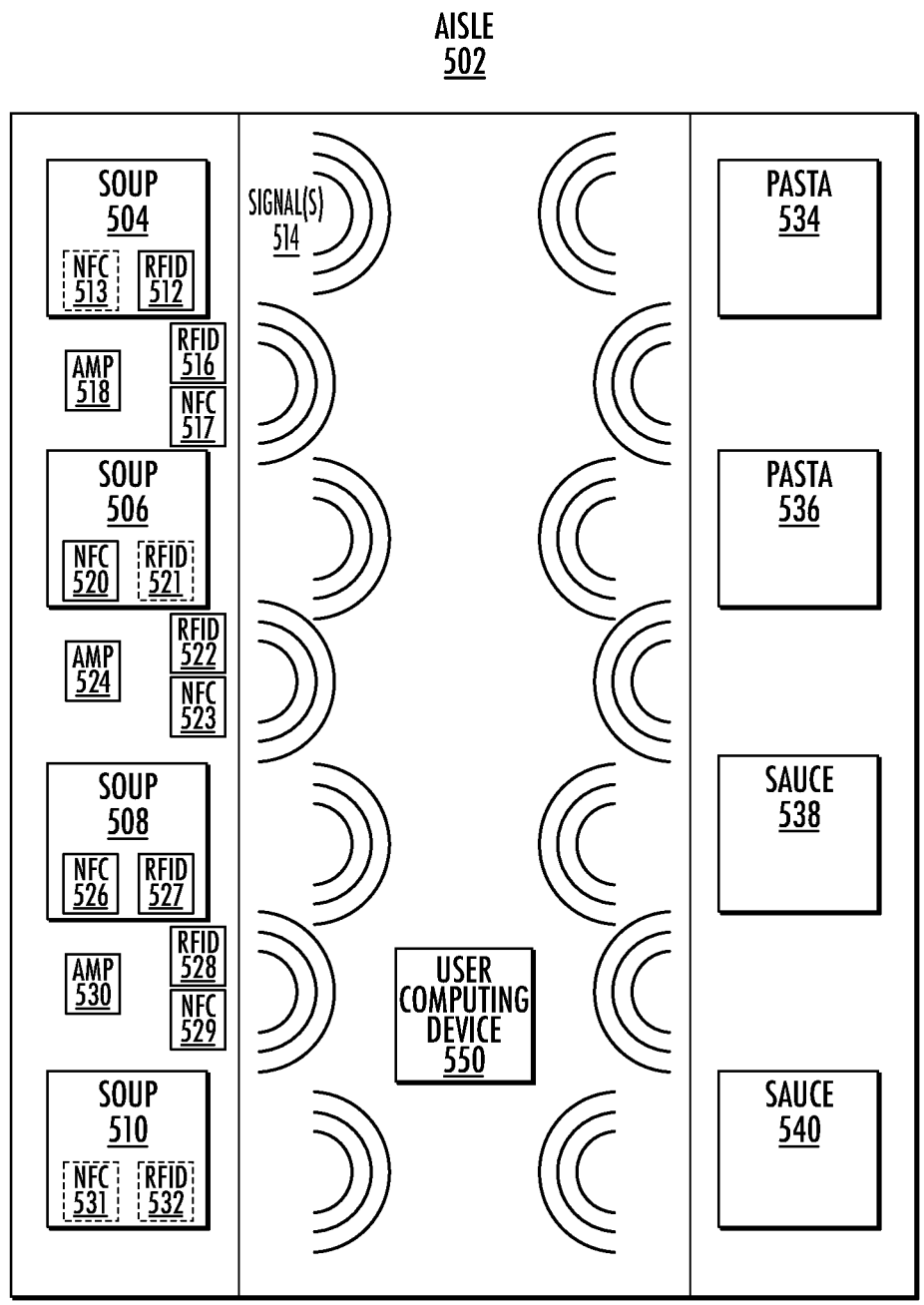
FIG. 5 illustrates an example password generation for a password manager application in accordance with one or more embodiments.

FIG. 5 illustrates example NFC and RFID signals according to one or more embodiments. By way of example, various products may be stocked and displayed along each side of a grocery store aisle. As shown, on one side of aisle 502, various soups may be stocked and displayed, e.g., soup 504, 506, 508, 510. On the other side of the aisle 502, various pasta-related items may be stocked and displayed, e.g., pasta 534, 536, pasta sauce 538, 540. Information related to these products may be transmitted via signals emitted from one or more NFC and/or RFID tags or sensors.

In examples, the tags or sensors may be located on the products themselves or may be arranged near or adjacent to the products, or both. As illustrated, an RFID tag 512 may be arranged on soup 504. Optionally, an NFC tag 513 may be arranged on the soup 504, as indicated by the dashed outline. As will be further described below, one or more signal(s) 514 from the RFID tag 512 (or the NFC tag 513) may be detected by an RFID (or NFC) reader of a user computing device 550, such as a user mobile computing device (e.g., smartphone, wearable computer, tablet, etc.). In some examples, one or more RFID or NFC tags may be placed or arranged next to the soup 504, such as RFID tag 516 and NFC tag 517, which may provide information not only on soup 504, but also on soup 506 (or any other products that may be stocked and displayed nearby).

To increase the signal strength from the tags, a signal amplifier, such as amplifier 518, may be arranged adjacent to or coupled with any of the RFID tags 512, 516 and/or NFC tags 513, 517. By increasing the signal strength, the one or more NFC or RFID signals from the sensors 512, 513, 516, 517 may be detected by a computing device further away, for example, at the other end of the aisle 502.

As further shown, an NFC tag 520 may be arranged on soup 506, and optionally, an RFID tag 521 may also be arranged thereon. Similar to the arrangement of RFID tag 516, NFC tag 517, and signal amplifier 518, an RFID tag 522, NFC tag 523, and signal amplifier 524 may also be arranged adjacent to soup 506. Signal(s) from the RFID tag 522 and NFC tag 523 may include information about not only soup 506, but also about soup 508 (and other adjacent products).

Soup 508 may be different from soup 504 and 506 in that it may have both an NFC tag 526 and an RFID tag 527 arranged thereon, as indicated by the solid lines. Whereas, for soup 510, NFC tag 531 and RFID tag 532 may both be optional, as shown by the dashed lines. Moreover, signals from RFID tag 528 and NFC tag 529 may include information about soups 508 and 510 (or any other nearby products) and amplified by signal amplifier 530.

According to embodiments, one or more NFC tags, RFID tags, and/or signal amplifiers may be configured on pasta side of the aisle 502 similarly to the soup side of the aisle. As shown, pastas 534, 536 and sauces 538, 540 may be stocked and displayed on the pasta side. In at least that regard, signals from the NFC tags and/or RFID tags arranged on the pasta products may transmit product-related information, which may be detected by the user computing device 550.

While FIG. 5 illustrates NFC and/or RFID tags arranged on both the products and adjacent to the products, it may be understood that any suitable arrangement the tags is possible, e.g., tags may be arranged only on the products, tags may be arranged only adjacent to the products, as long as the product-related information can be sent to the user computing device 550. Moreover, it may be understood that the signal amplifiers may be configured in any suitable way to enhance the reach and coverage of the signals from the NFC and/or RFID tags.

Figure 6:
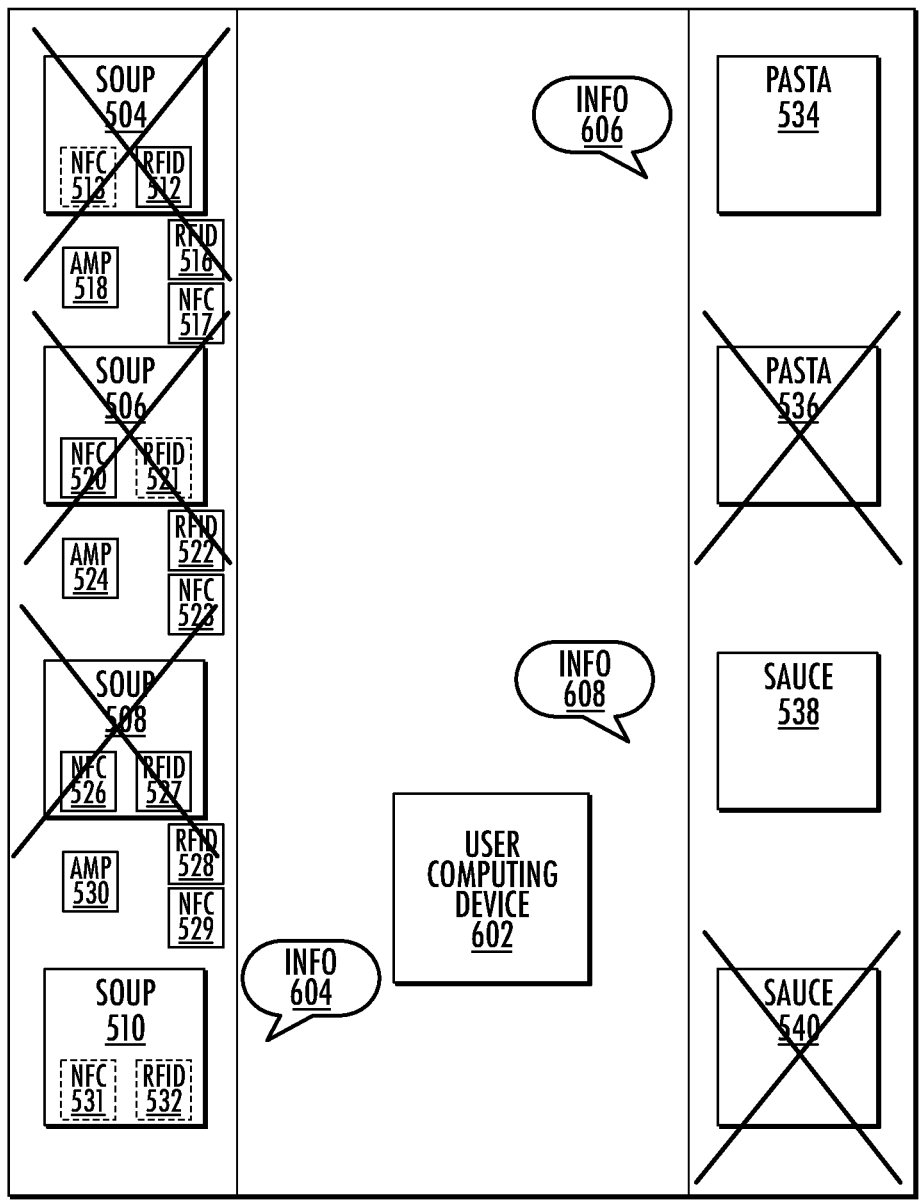
FIG. 6 illustrates another example of a sequence diagram relating to secure password generation in accordance with one or more embodiments.

FIG. 6 illustrates an example filtration process 600 of product-related information based on a user profile according to one or more embodiments. For ease of explanation, at least the products (e.g., soup, pasta, sauce) on each side of aisle 502 illustrated in FIG. 5 will be used in FIG. 6 to describe the filtration process 600.

As a user moves through or walks down the aisle 502, a user computing device 602, which belongs to the user, may detect numerous signals from the NFC and/or RFID tags arranged on and/or adjacent to the products. In examples, an NFC reader configured in the user computing device 602 may detect all of the NFC signals from the NFC tags. In further examples, an RFID reader configured in the user computing device 602 may detect all of the RFID signals from the RFID tags. The RFID reader, for instance, may be a passive ultra-high frequency (UHF) RFID reader.

Upon receiving the product-related information via the detected signals, the user computing device 602 may filter out any information that may be irrelevant to the user. For example, the user shopping profile may indicate specific ingredients that the user may be allergic to (or fall under a dietary restriction). If soups 504, 506, and 508 contain those ingredients, then product-related information associated with the soups 504, 506, and 508 are not displayed in AR, as indicated by the cross outs. In another example, the user shopping profile may indicate that the user is on a budget plan and prefers not to spend more than a predetermined amount on specific items. If soups 504, 506, and 508 exceed the specified amount, then the product-related information corresponding to soups 504, 506, and 508 are not displayed in AR. Relevancy may be understood to refer to, or may be determined based on, how closely the products (or related information) match the various descriptions, indications, preferences, etc. specified in the user shopping profile. In examples, a degree of match may be determined, e.g., threshold matching—a predetermined or predefined level of similarly may be considered a match.

As illustrated, if a product is determined not to be irrelevant, such as soup 510, the user computing device 602 may display in AR the information associated with that product, such as information bubble 604. As will be further described below, information bubble 604 may include an in-store customer comment regarding the soup 510, e.g., "pairs well with a grilled cheese sandwich," "wait till the end of month for a deal, three for three dollars," "tasty," may include a star-based review, e.g., "four out of five stars," etc.

In some instances, one or more criteria may have to be met for the product-related information to be displayed. For example, the one or more criteria may include previously purchased products, products related to a meal plan set by the user, products comporting with a dietary restriction of the user, products allowed under a diet that the user may be on, products related to the user's favorite snacks, products related to the user's favorite seasonal fruits, products related to the user's favorite protein, discounted products or various specials on the products (which may be specified by the user), frequently purchased products by the user, products recommended by a personal shopper or shopping system associated with the user, products that meet a threshold product rating set by the user, etc. For example, soup 510 may be a product that comports with the user's dietary restriction and has a five-star product rating, which meets the user-set threshold rating of four stars.

As further shown, the similar filtration process may be applied on the pasta side of the aisle 502. For example, information related to pasta 536 and sauce 540 may be excluded (as indicated by the cross outs) from AR display because they may include ingredients that fall under dietary restriction(s), or in other examples, because they fall under a threshold product rating previously set by the user for pasta products. It may be determined that pasta 534 and sauce 538 are not irrelevant, and thus, information bubbles 606 and 608 associated therewith, respectively, may be displayed in AR. Similar to information bubble 604, information bubbles 606 and 608 may include in-store customer comments and/or customer reviews. For example, information 608 may include a comment that states, "pairs well with angel hair."

Moreover, information bubbles may be considered relevant when at least the information contained therein is related to or based on a history or a pattern of purchases or financial transactions that are unique to the user and made by the user via the contactless card. For example, if the user purchases Greek yogurt every time, then yogurt products may be relevant to the user. In another example, if it is determined that the user prefers to purchase discounted or store-brand products based on the user's financial transactions, then discounted or store-brand products may be more relevant than other brands. In further examples, the user may selectively view comments and/or reviews of a product by scanning a barcode of that product.

Figure 7:
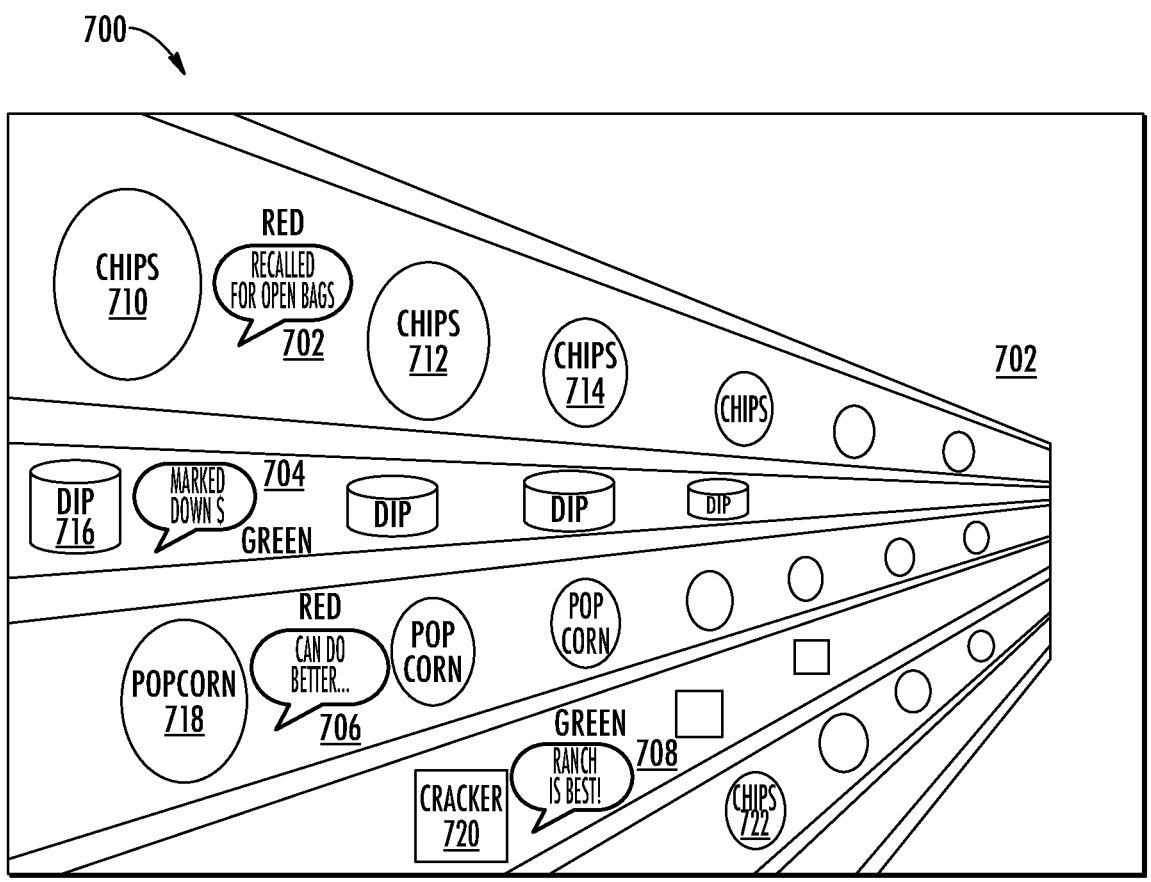
FIG. 7 illustrates another example of password generation for a website in accordance with one or more embodiments.

FIG. 7 illustrates example information bubbles displayed in AR space 700 according to one or more embodiments. As described above, an information bubble may include one or more types of information related to a product, such as a product identification number (e.g., a unique, searchable number), in-store customer reviews, in-store customer comments, in-store customer ratings, external customer reviews, external comments, and other types of external information. In examples, the external information may be web-based information, which may include web reviews, product specification sheets, web ratings, visual renderings or images of various items or components within the products such that the items or components are viewable in AR outside of the packaging of the products, etc. In some examples, the user computing device may retrieve or search for the external information upon obtaining the name of the product, product identification number, or any other information related to the product that can be searched on the Internet.

As shown in FIG. 7, four different information bubbles 702, 704, 706, and 708 may be displayed in AR via a user computing device (not shown). It may be understood that FIG. 7 is what the user may see on the display screen of the user computing device. The information bubbles may provide information one or more of the various products stocked on the "chips and snack" side of aisle 702, which may include chips 710, 712, 714, 722, dip 716, popcorn 718, cracker 720, and so on.

In examples, information bubble 702 may be displayed adjacent to chips 710, which may be an externally-retrieved comment and recites "Recalled for open bags." According to embodiments, comments, reviews, or information that are negative may be color-coded, e.g., in red. Thus, some or all portions of the information bubble 702 may be red to indicate that the information contained in the bubble is negative.

Comments, reviews, or information that are positive may also be color-coded, e.g., in green. For example, information bubble 704 may be positioned in AR adjacent to dip 716 and may be an in-store comment or review (provided by the store or an in-store customer), which states "Marked down $." Thus, some or all portions of the information bubble 704 may be green to indicate positive information. It may be understood that what might be negative or positive may be relative and/or specific to the user, e.g., it may be possible that what is positive for one user may be negative for a different user.

As further shown in FIG. 7, information bubble 706 may be positioned adjacent to popcorn 718, which is an in-store customer comment or review reciting "can do better." In examples, if there are multiple comments of the same product, e.g., popcorn 718, the user computing device may rank each of the comments based on the user's specific preferences. If popcorn is a product that the user always purchases, then a comment that includes an alternative suggestion would be highly ranked, for instance, a comment that may recite, "The other popular popcorn brand is better." Since the information contained in bubble 706 is negative, again, some or all portions of the bubble may be color-coded in red.

Moreover, information bubble 708 may be displayed or positioned in AR adjacent to cracker 720 and may be an external web review indicating that the ranch flavor is the best flavor. Similar to bubble 704, information bubble 708 may be color-coded in green since it contains positive information.

Figure 8:
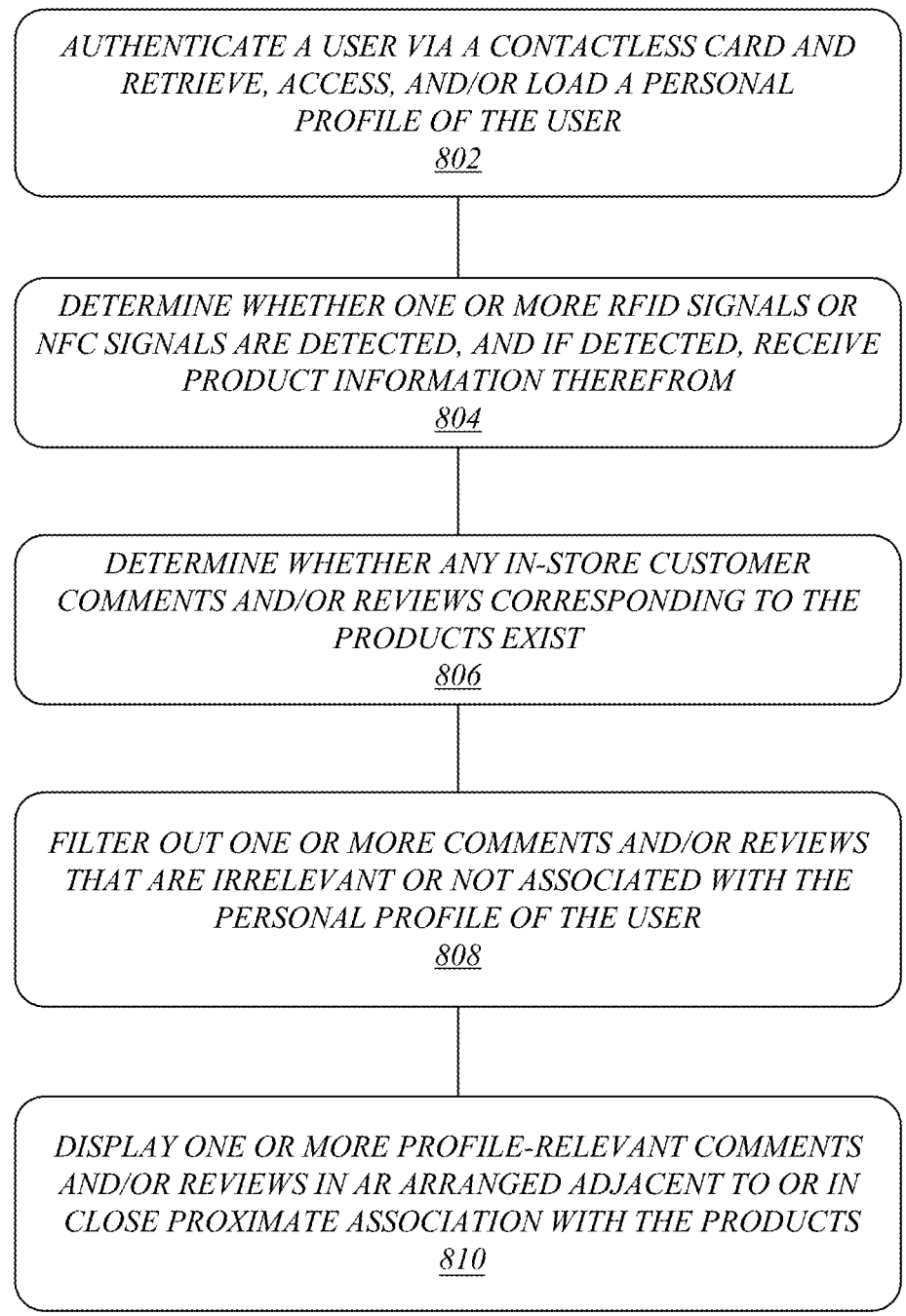
FIG. 8 illustrates an example flow diagram in accordance with one or more embodiments.

FIG. 8 illustrates an example flow diagram 800 according to one or more embodiments. It may be understood that the features associated with the illustrated blocks may be performed or executed by one or more computing devices, e.g., a mobile computing device, and/or processing circuitry contained therein. Moreover, it may be understood that the blocks in flow diagram 800 are not limited to any specific order, and the one or more blocks may be performed or executed simultaneously.

At block 802, a user may be authenticated into a shopping application via a contactless card, e.g., tapping the contactless card to the user's mobile computing device. Upon authentication, the mobile computing device may retrieve, access, and/or load a personal profile of the user. As described above, the personal profile may indicate various types of information about the user and the user's preferences, e.g., dietary restrictions, preferred meal plans, diets, favorites, previous purchases, frequent purchases, product rating preferences, personal shopper settings, reviews given, etc. Moreover, financial transaction data and transaction histories associated with the contactless card may be provided as part of the user's profile.

At block 804, the mobile computing device may determine whether one or more RFID and/or NFC signals are detected. If detected, product information from the detected RFID and/or NFC signals is received. As set forth above, RFID and/or NFC tags may be arranged on the products themselves and/or near the products. Signal amplifiers may be arranged along an aisle so as to amplify the signals from the RFID and/or NFC tags.

At block 806, it is determined whether any in-store customer comments and/or reviews corresponding to the detected products exist. The in-store customer comments may be provided by the customers shopping in that store and may be related to the product in any manner, e.g., product discounts, whether the product tastes good, what the product pairs well with when cooking, etc. It may be understood that external reviews, such as online reviews by online customers, related to the detected products may also be obtained.

At block 808, the mobile computing device may determine which of the in-store comments and/or reviews (or external reviews) are relevant to the user based on the user's profile. If the comments and/or reviews are not relevant to the user in any way, they are filtered out and not displayed to the user. In some examples, relevancy may be determined based on a relevancy score (e.g., percentage score). For instance, if comments and/or reviews mention a certain relevant product, but is not actually about that product, those comments and/or reviews may still be displayed even though they are not directly on point. Advantageously, the user's financial transaction data and history associated with the contactless card may also be used to determine relevancy. By way of example, if it is known that the user always purchases a dozen eggs on every shopping visit, then eggs will always be considered a relevant product.

At block 810, the profile-relevant comments and/or reviews may be displayed in AR to the user as information bubbles, which may be arranged adjacent to the relevant product or in close approximate association with the product. For example, even if the user moves around the object, the information bubble may appear to be stationary from the perspective of the user. Moreover, as described above, the user can selectively choose which products to focus on, for example, by scanning the product's barcode.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be used together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose and may be selectively activated or reconfigured by a computer program stored in the computer. The procedures presented herein are not inherently related to a particular computer or other apparatus. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus comprising:
a radio frequency identification (RFID) reader and a near-field communication (NFC) reader;
a memory storing instructions; and
a processor, coupled with the memory, operable to execute the instructions, that when executed, cause the processor to:
receive, via the NFC reader, encrypted authentication data received from a contactless card of a user;
transmit, to an authentication server, a one-tap authentication request comprising the encrypted authentication data to authenticate the user based on the encrypted authentication data;
receive, from the authentication server, a one-tap authentication confirmation specifying the authentication server decrypted the encrypted authentication data to authenticate the user based on the encrypted authentication data;
access a personal profile associated with the user based at least in part on the one-tap authentication confirmation, wherein the personal profile is associated with the contactless card;
detect one or more RFID signals from one or more RFID tags and/or one or more NFC signals from one or more NFC tags in a store;
receive one or more product identification numbers from the one or more RFID tags and/or the one or more NFC tags;
receive, from the one or more RFID tags and/or the one or more NFC tags, product information associated with a plurality of products based on the received product identification numbers, wherein the product information comprises in-store customer comments and reviews corresponding to the plurality of products;
receive web-based information corresponding to the plurality of products based at least in part on the received product information, wherein the web-based information comprises images of items in each of the plurality of products such that the items are viewable outside a packaging of each product;
determine, based on the one-tap authentication confirmation, which of the in-store customer comments and reviews are relevant to the user to generate one or more profile-relevant in-store customer comments and reviews, wherein the determination of the relevancy comprises at least: (i) analyzing past financial transactions made by the user via the contactless card at the store, (ii) determining one or more shopping patterns and one or more budget-related preferences in the analyzed financial transactions and whether the one or more shopping patterns and the one or more budget-related preferences relate to any of the plurality of products with the in-store customer comments and reviews, (iii) determining whether there is a predetermined price not to be exceeded for a specific item and determining, for each of the plurality of products, whether the product relates to the specific item and whether the product exceeds the predetermined price, and (iv) identifying the related in-store customer comments and reviews as profile-relevant;
launch, based on the one-tap authentication confirmation, an application including an augmented reality (AR) graphical user interface (GUI);
display, by the application, the web-based information comprising the images of the items and the one or more profile-relevant in-store customer comments and reviews in the AR GUI as one or more information bubbles arranged proximate to the respective plurality of products, wherein the displayed one or more profile-relevant in-store customer comments and reviews are color coded in a first color to indicate a first type of information and in a second color different from the first color to indicate a second type of information different from the first type of information;
determine, by the application, that the NFC reader has detected an NFC tag or sensor associated with a specific product or determine that a barcode of the specific product has been scanned; and display, by the application in the AR GUI, only the in-store customer comments and reviews corresponding to the specific product.

2. The apparatus of claim 1, wherein the RFID reader is a passive ultra-high frequency (UHF) RFID reader.

3. The apparatus of claim 1, wherein the contactless card is tapped to or brought near the apparatus to authenticate the user.

4. The apparatus of claim 1, wherein the personal profile comprises: (i) a dietary restriction of the user, (ii) a meal plan set by the user, (iii) a diet that the user is on, (iv) a favorite snack, (v) a favorite seasonal fruit, (vii) a budget plan, (viii) a list of products purchased during a predefined time period, (ix) a favorite protein, (x) a preference for a specific discounted product, (xi) a list of frequently purchased products, (xii) a personal shopper system linked by the user, and (xiii) a product rating preference set by the user.

5. The apparatus of claim 1, wherein the one or more profile-relevant in-store customer comments and reviews are in-store customer comments and reviews corresponding to the plurality of products meeting the following criteria: (i) previously purchased products, (ii) products related to a meal plan set by the user, (iii) product comporting with a dietary restriction of the user, (iv) products allowed under a diet the user is on, (v) products related to a favorite snack of the user, (vi) products related to a favorite seasonal fruit of the user, (vii) products related to a favorite protein of the user, (viii) discounted products or specials on products specified by the user, (ix) product related to frequently purchased products by the user, (x) products recommended by a personal shopper system associated with the user, and (xi) products meeting a threshold product rating set by the user.

6. The apparatus of claim 1, wherein the one or more RFID tags and/or the one or more NFC tags are arranged on or adjacent to the plurality of products.

7. The apparatus of claim 1, wherein the one or more RFID signals from one or more RFID tags and/or one or more NFC signals from one or more NFC tags are amplified by a signal amplifier.

8. The apparatus of claim 1, wherein the processor is further caused to:
   determine, based on the determination of relevancy, that a first product of the plurality of products is relevant to the user and a second product of the plurality of products is not relevant to the user;
   generating a filtered plurality of products by filtering the second product of the plurality of products based on the determination that the second product is not relevant to the user; and
   display indications of the filtered plurality of products in AR.

9. The apparatus of claim 1, wherein the first type of information indicates that the one or more profile-relevant in-store customer comments and reviews are positive and the second type of information indicates that the one or more profile-relevant in-store customer comments and reviews are negative.

10. The apparatus of claim 9, wherein the first color is green and the second color is red.

11. The apparatus of claim 1, wherein the encrypted authentication data is generated by the contactless card based at least in part on a private key and a counter value for the contactless card stored in a memory of the contactless card, wherein the processor is further caused to:
   transmit (i) a merchant identifier of a merchant and (ii) a transaction identifier with the one-tap authentication request to the authentication server, the authentication server to verify the encrypted authentication data by decrypting the encrypted authentication data based at least in part on the private key and the counter value for the contactless card stored in a memory of the authentication server;
   generate, by a virtual account number server based on the verification of the encrypted authentication data, a virtual account number;
   transmit, by the virtual account number server, the merchant identifier, the transaction identifier, the virtual account number, an expiration date associated with the virtual account number, and a card verification value (CVV) associated with the virtual account number to a merchant server associated with the merchant; and
   process, by the merchant server, the transaction using the transaction identifier, the virtual account number, the expiration date, and the CVV.

12. The apparatus of claim 1, wherein the web-based information further comprises: (i) web reviews, (ii) specification sheets, and (iii) web ratings.

13. The apparatus of claim 1, wherein the apparatus is a mobile computing device or a wearable computing device.

14. The apparatus of claim 1, wherein the one-tap authentication confirmation automatically logs the user into the application, and wherein the instructions cause the processor to:
   receive, by the application based on the one-tap authentication confirmation, input comprising a review of the specific product; and
   display, by the application in the AR GUI, the review of the specific product as another information bubble proximate to the specific product.

15. A method comprising:
   receiving, via a near-field communication (NFC) reader of a computing device, encrypted authentication data from a contactless card of a user;
   transmitting, by the device to an authentication server, a one-tap authentication request comprising the encrypted authentication data to authenticate the user based on the encrypted authentication data;
   receiving, by the device, a one-tap authentication confirmation specifying the authentication server decrypted the encrypted authentication data to authenticate the user based on the encrypted authentication data;
   accessing, via the device, a personal profile associated with the user based at least in part on the one-tap authentication confirmation, wherein the personal profile is associated with the contactless card;
   detecting, via the device, one or more radio frequency identification (RFID) signals from one or more RFID tags and/or one or more NFC signals from one or more NFC tags in a store;
   receiving, via the device, one or more product identification numbers from the one or more RFID tags and/or the one or more NFC tags;
   receiving, via the device from the one or more RFID tags and/or the one or more NFC tags, product information associated with a plurality of products based on the received product identification numbers;
   receiving, via the device, web-based information corresponding to the plurality of products based at least in part on the received product information, wherein the web-based information comprises images of items in each of the plurality of products such that the items are viewable outside a packaging of each product;

determining, via the device based on the one-tap authentication confirmation, whether any product information corresponding to the product information exist and determining which of the product information is relevant to the user, wherein the determining of the product information relevant to the user comprises at least: (i) analyzing past financial transactions made by the user via the contactless card at the store, (ii) determining one or more shopping patterns and one or more budget-related preferences in the analyzed financial transactions and whether the one or more shopping patterns and the one or more budget-related preferences relate to any of the plurality of products with the product information, (iii) determining whether there is a predetermined price not to be exceeded for a specific item and determining, for each of the plurality of products, whether the product relates to the specific item and whether the product exceeds the predetermined price, and (iv) identifying the related product information as relevant;

launching, via the device based on the one-tap authentication confirmation, an application including an augmented reality (AR) graphical user interface (GUI);

overlaying, by the application, the web-based information comprising the images of the items and the relevant product information in the AR GUI proximate to the plurality of products, wherein the overlaid product information are color coded in a first color to indicate a first type of information and in a second color different from the first color to indicate a second type of information different from the first type of information;

determining, by the application, that the NFC reader has detected an NFC tag or sensor associated with a specific product or determine that a barcode of the specific product has been scanned; and displaying, by the application in the AR GUI, only the in-store customer comments and reviews corresponding to the specific product.

16. The method of claim 15, wherein the product information comprises: (i) in-store reviews or comments related to the plurality of products, (ii) external reviews or comments related to the plurality of products, (iii) customer ratings of the plurality of products, and (iv) safety-related information related to the plurality of products.

17. A non-transitory computer-readable storage medium storing computer-readable program code executable by a processor to:

receive, from a near-field communication (NFC) reader, encrypted authentication data generated by a contactless card belonging to a user;

transmit, to an authentication server, a one-tap authentication request comprising the encrypted authentication data to authenticate the user based on the encrypted authentication data;

receive a one-tap authentication confirmation specifying the authentication server decrypted the encrypted authentication data to authenticate the user based on the encrypted authentication data;

access a personal profile associated with the user based at least in part on the one-tap authentication confirmation, wherein the personal profile is associated with the contactless card;

detect one or more radio frequency identification (RFID) signals of one or more RFID tags and/or one or more NFC signals of one or more NFC tags at a store;

receive one or more product identification numbers from the one or more RFID tags and/or the one or more NFC tags;

identify product identification information of a plurality of products based on the received product identification numbers, wherein each product identification number uniquely identifies a respective product of the plurality of products;

receive, from the one or more RFID tags and/or the one or more NFC tags, product information corresponding to the product identification information;

receive web-based information corresponding to the plurality of products based at least in part on the received product information, wherein the web-based information comprises images of items in each of the plurality of products such that the items are viewable outside a packaging of each product;

determine, based on the one-tap authentication confirmation, which of the product information is relevant for display, wherein the determination of the relevancy comprises at least: (i) analyzing past financial transactions made by the user via the contactless card at the store, (ii) determining one or more shopping patterns and one or more budget-related preferences in the analyzed financial transactions and whether the one or more shopping patterns and the one or more budget-related preferences relate to the product, (iii) determining whether there is a predetermined price not to be exceeded for a specific item and determining, for each of the plurality of products, whether the product relates to the specific item and whether the product exceeds the predetermined price, and (iv) identifying the product information as relevant;

launch, based on the one-tap authentication confirmation, an application including an augmented reality (AR) graphical user interface (GUI);

display, by the application, the web-based information comprising the images of the items and the relevant product information in the AR GUI proximate to the product, wherein the displayed product information are color coded in a first color to indicate a first type of information and in a second color different from the first color to indicate a second type of information different from the first type of information;

determine, by the application, that the NFC reader has detected an NFC tag or sensor associated with a specific product or determine that a barcode of the specific product has been scanned; and display, by the application in the AR GUI, only the in-store customer comments and reviews corresponding to the specific product.

18. The apparatus of claim 9, wherein only color of the one or more profile-relevant in-store customer comments and reviews is displayed at a first predefined distance from the plurality of products and wherein one or more headlines of the one or more information bubbles is displayed at a second predefined distance from the plurality of products.

19. The apparatus of claim 18, wherein the first predefined distance is a respective distance between the plurality of products and the apparatus, wherein the second predefined distance is a respective distance between the plurality of products and the apparatus.

20. The apparatus of claim 1, wherein the encrypted authentication data comprises a message authentication code (MAC) cryptogram, wherein the one-tap authentication confirmation is further based on the authentication server verifying the MAC cryptogram, wherein the verification is based on the MAC cryptogram as a digital signature.

* * * * *